(12) United States Patent
Poeppel et al.

(10) Patent No.: US 11,427,223 B2
(45) Date of Patent: Aug. 30, 2022

(54) DRIVING SURFACE FRICTION ESTIMATIONS FOR AUTONOMOUS VEHICLES

(71) Applicants: UATC, LLC, San Francisco, CA (US); Volvo Car Corporation, Gothenburg (SE)

(72) Inventors: Scott C. Poeppel, Pittsburgh, PA (US); Mats Jonasson, Partille (SE)

(73) Assignee: UATC, LLC, Mountain View, CA (US)

( * ) Notice: Subject to any disclaimer, the term of this patent is extended or adjusted under 35 U.S.C. 154(b) by 838 days.

(21) Appl. No.: 16/131,727

(22) Filed: Sep. 14, 2018

(65) Prior Publication Data

US 2020/0089243 A1   Mar. 19, 2020

(51) Int. Cl.
*B60W 60/00* (2020.01)
*G05D 1/02* (2020.01)
(Continued)

(52) U.S. Cl.
CPC ..... *B60W 60/00184* (2020.02); *B60T 8/1763* (2013.01); *B60W 30/18172* (2013.01);
(Continued)

(58) Field of Classification Search
CPC ..... B60W 60/00184; B60W 60/00182; B60W 40/068; B60W 30/18172; B60W 50/0097;
(Continued)

(56) References Cited

U.S. PATENT DOCUMENTS 5,944,392 A * 8/1999 Tachihata ............... B60T 8/172
303/112
2016/0368503 A1* 12/2016 Jonasson ............... B60R 16/023
(Continued)

FOREIGN PATENT DOCUMENTS

EP   1512598      3/2005
EP   2883771 A1   6/2015
(Continued)

OTHER PUBLICATIONS

International Search Report and Written Opinion for PCT/US2019/651271, dated Jan. 13, 2020, 12 pages.
(Continued)

*Primary Examiner* — Dale W Hilgendorf
(74) *Attorney, Agent, or Firm* — Dority & Manning, P.A.

(57) ABSTRACT

Systems and methods are provided for generating data indicative of a friction associated with a driving surface, and for using friction data as part of controlling autonomous vehicle operations. In one example, a computing system can detect an event including at least one of an acceleration, a deceleration, or a stop associated with an autonomous vehicle and obtain, in response to detecting the event, operational data associated with the autonomous vehicle during the event. The computing system can determine, based at least in part on the operational data, data indicative of a friction associated with a surface upon which the autonomous vehicle is traveling during the event. The computing system can control the autonomous vehicle based at least in part on the data indicative of the friction associated with the surface.

20 Claims, 14 Drawing Sheets

(51) Int. Cl.
*G01C 21/34* (2006.01)
*B60W 40/068* (2012.01)
*B60W 30/18* (2012.01)
*B60W 50/00* (2006.01)
*B60T 8/1763* (2006.01)

(52) U.S. Cl.
CPC ...... *B60W 40/068* (2013.01); *B60W 50/0097* (2013.01); *B60W 60/00182* (2020.02); *G01C 21/3461* (2013.01); *G05D 1/0221* (2013.01); *B60T 2210/12* (2013.01); *B60W 2050/0026* (2013.01); *B60W 2510/202* (2013.01); *B60W 2520/04* (2013.01); *B60W 2520/26* (2013.01); *B60W 2552/40* (2020.02); *G05D 2201/0213* (2013.01)

(58) Field of Classification Search
CPC ..... B60W 2552/40; B60W 2050/0026; B60W 2510/202; B60W 2520/04; B60W 2520/26; B60T 8/1763; B60T 2210/12; G05D 1/0221; G05D 2201/0213; G01C 21/3461
See application file for complete search history.

(56) References Cited

U.S. PATENT DOCUMENTS

| | | | |
|---|---|---|---|
| 2017/0166216 A1* | 6/2017 | Rander | G05D 1/0088 |
| 2018/0059667 A1* | 3/2018 | Kuroda | G06F 3/14 |
| 2018/0217050 A1* | 8/2018 | Heil | B60T 8/172 |
| 2019/0047527 A1* | 2/2019 | Falconer | B60W 10/06 |
| 2019/0111932 A1* | 4/2019 | Falconer | B60W 30/18172 |
| 2019/0126933 A1* | 5/2019 | Jonasson | B60W 40/105 |
| 2020/0079381 A1* | 3/2020 | Lombrozo | B62D 6/003 |
| 2020/0086880 A1* | 3/2020 | Poeppel | G05D 1/021 |
| 2021/0316758 A1* | 10/2021 | Oboril | B60W 60/0016 |

FOREIGN PATENT DOCUMENTS

| | | | |
|---|---|---|---|
| EP | 2960137 | | 12/2015 |
| EP | 3309025 | | 4/2018 |
| JP | 3206090 | B2 * | 9/2001 |
| JP | 4858694 | B2 * | 1/2012 |
| WO | WO-2020198443 | A1 * | 10/2020 .......... B50W 40/068 |

OTHER PUBLICATIONS

Fankem, S., et al. "Model-based Rack Force Estimation for Electric Power Steering," 19th International Federation of Automatic Control World Congress, Aug. 24-29, 2014, 8469-8474.

Jagt, Van Der, P. "The road to virtual vehicle prototyping: new CAE-models for accelerated vehicle dynamics development," Eindhoven: Technische Universiteit Eindhoven DOI: 10.6100/IR537564.

Sharp, R.S. "On car steering torques at parking speeds," Proc. Instn. Mech. Engrs vol. 217 Part D: J. Automobile Engineering, 87-96.

* cited by examiner

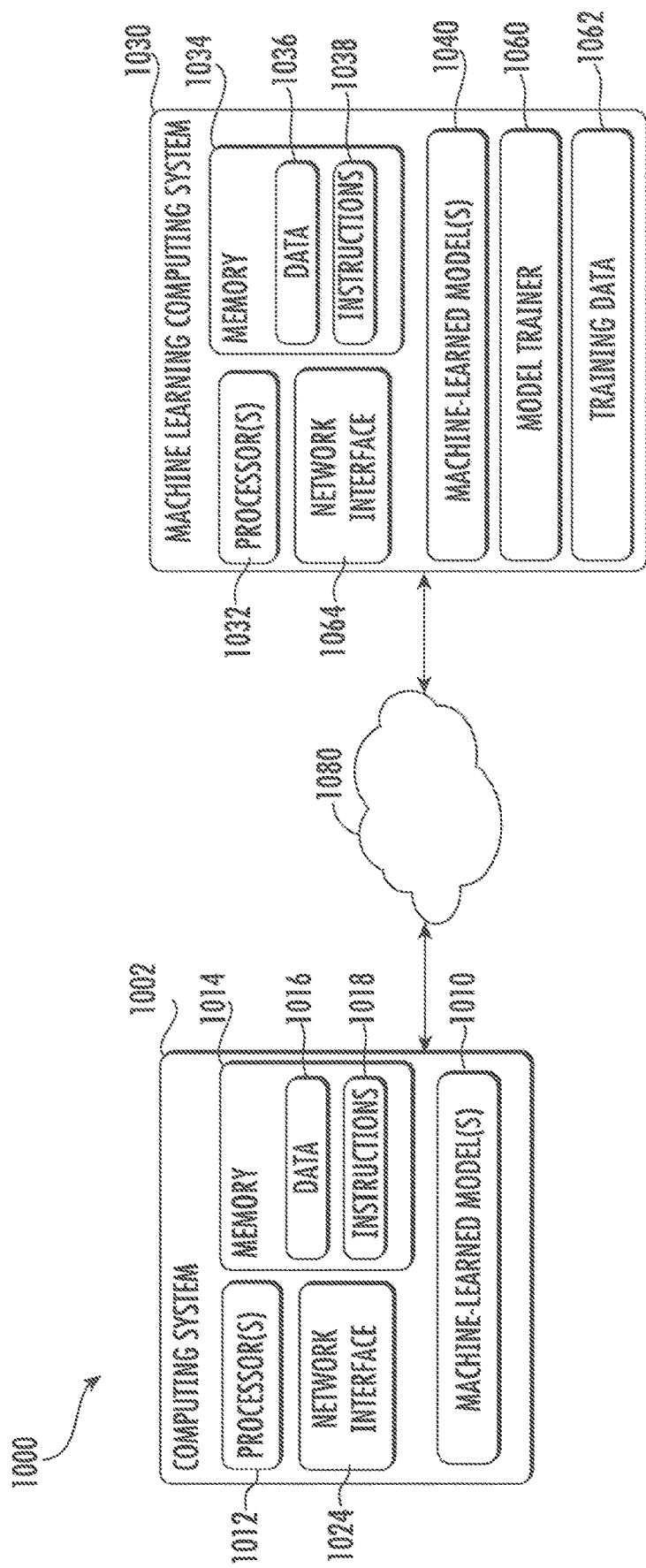

DRIVING SURFACE FRICTION ESTIMATIONS FOR AUTONOMOUS VEHICLES

FIELD

The present disclosure relates generally to improving the ability of computing systems to determine information about an external environment and make predictions, such as to enable a vehicle to determine information about a surrounding environment and to provide data indicative of the same.

BACKGROUND

Vehicles including non-autonomous vehicles and autonomous vehicles increasingly include one or more computing systems. An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such surrounding environment. Similarly, a non-autonomous vehicle may include sensors that are used to observe an external environment.

SUMMARY

Aspects and advantages of embodiments of the present disclosure will be set forth in part in the following description, or may be learned from the description, or may be learned through practice of the embodiments.

One example aspect of the present disclosure is directed to a computing system. The computing system includes one or more processors and one or more non-transitory computer-readable media that store instructions, that when executed by the one or more processors, cause the one or more processors to perform operations. The operations include detecting an event including at least one of an acceleration, a deceleration, or a stop associated with an autonomous vehicle, obtaining, in response to detecting the event, operational data associated with the autonomous vehicle during the event, determining, based at least in part on the operational data, data indicative of a friction associated with a surface upon which the autonomous vehicle is traveling during the event, and controlling the autonomous vehicle based at least in part on the data indicative of the friction associated with the surface.

Another example aspect of the present disclosure is directed to an autonomous vehicle that includes one or more processors and one or more non-transitory computer-readable media that store instructions that, when executed by the one or more processors, cause the autonomous vehicle to perform operations. The operations include detecting an event including at least one of an acceleration, a deceleration, or a stop associated with an autonomous vehicle, obtaining, in response to detecting the event, operational data associated with the autonomous vehicle during the event, determining, based at least in part on the operational data, data indicative of a friction associated with a surface upon which the vehicle is traveling during the event, and generating at least one constraint for the autonomous vehicle based at least in part on the data indicative of the friction associated with the surface.

Yet another example aspect of the present disclosure is directed to a computer-implemented method that includes detecting an event including at least one of an acceleration, a deceleration, or a stop associated with an autonomous vehicle, obtaining, in response to detecting the event, operational data associated with the autonomous vehicle during the event, determining, based at least in part on the operational data, data indicative of a friction associated with a surface upon which the autonomous vehicle is traveling during the event, and controlling the autonomous vehicle based at least in part on the data indicative of the friction associated with the surface.

Other example aspects of the present disclosure are directed to systems, methods, vehicles, apparatuses, tangible, non-transitory computer-readable media, and memory devices for determining the location of an autonomous vehicle and controlling the autonomous vehicle with respect to the same.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 15 depicts a block diagram of an example computing system according to example embodiments of the present disclosure.

DETAILED DESCRIPTION

Figure 1:
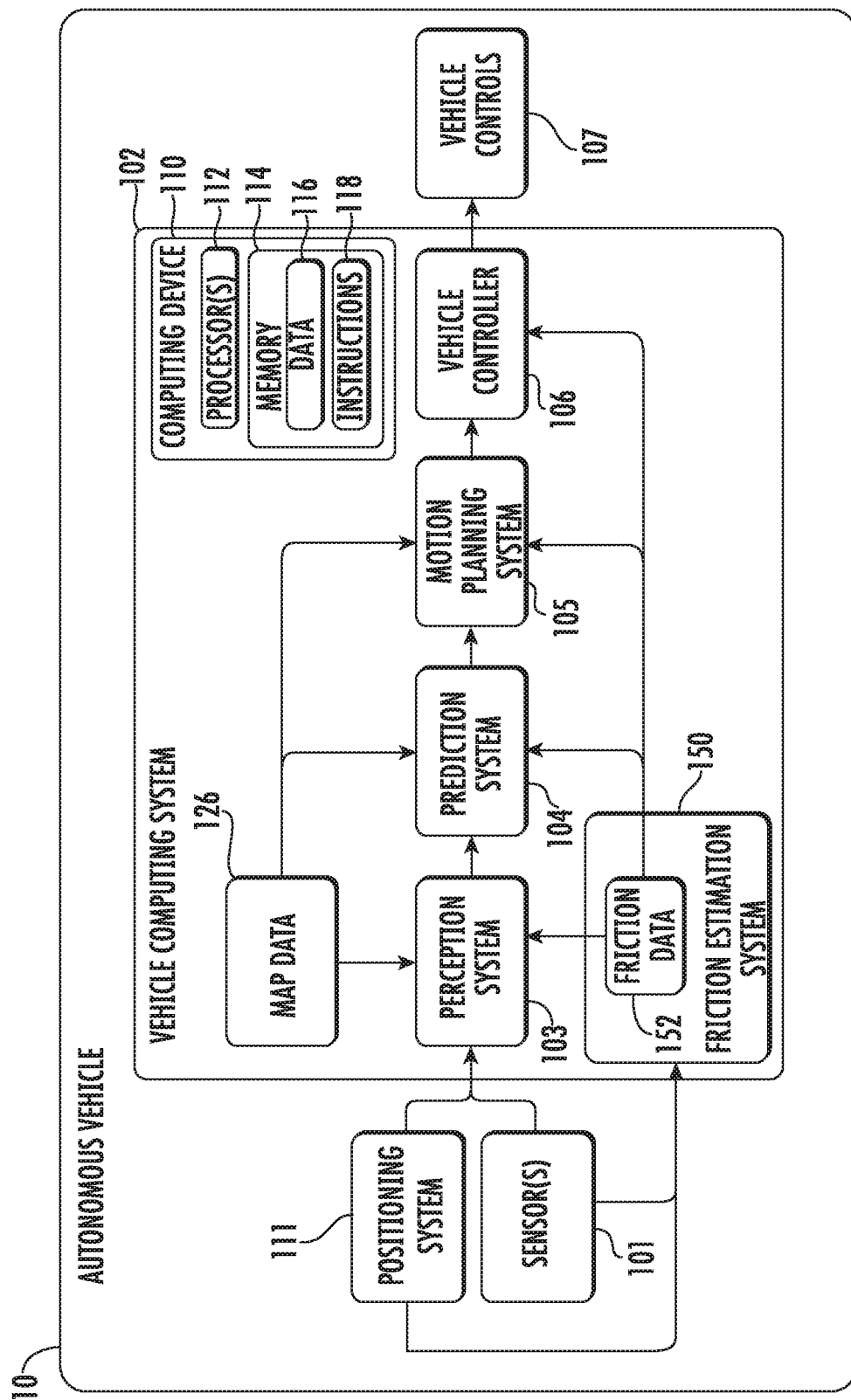
FIG. 1 is a block diagram of an example autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to systems and methods that enable vehicles such as autonomous or non-autonomous vehicles to automatically estimate a friction force associated with a driving surface upon which the vehicle is traveling, and to use the friction estimation as part of vehicle operations, to provide an indication of the friction estimation in association with the vehicle, and/or to communicate the friction estimation to other vehicles or computing systems. For instance, the systems and methods of the present disclosure enable a vehicle to utilize operational data associated with the vehicle during particular events in order to make friction estimations associated with the driving surface. More particularly, in some implementations, a vehicle computing system associated with a vehicle can obtain operational data associated with the vehicle during an event (e.g., as the vehicle decreases speed as it approaches a stop sign, is stopped at the stop sign, increases speed as it departs from an intersection, or increases an angular acceleration in response to a change in steering angle). The vehicle computing system can use the operational data to determine data indicative of a friction associated with the driving surface. The vehicle computing system can provide an indication of the friction estimation within a vehicle, such as to a driver of the vehicle and/or communicate the friction estimation to other vehicles or computing systems. According to some aspects, the vehicle may be an autonomous vehicle and the vehicle computing system can control the autonomous vehicle based at least in part on the data indicative of the friction.

According to example embodiments of the present disclosure, a vehicle may generate friction estimations while minimizing and/or eliminating disruptions to passengers of the vehicle. By way of example, a vehicle may detect events during which a friction estimation can be determined without causing significant changes to normal vehicle operations that may be perceptible to a passenger. These events can coincide with geographic areas and/or environments in which vehicles may typically decrease speed, stop, increase speed, etc. For instance, a vehicle may detect that one or more events including an acceleration, deceleration, or stop of the vehicle are likely to occur at an upcoming stop light, stop sign, yield area, etc. and determine a friction associated with a driving surface during these detected events. An event may include an acceleration event, a deceleration event, and/or a stop event. Such events may be associated with an increase in speed, a decrease in speed, or a stop in movement by a vehicle. An increase or decrease in speed may be in the forward travel direction of the vehicle, in a lateral direction to that of the travel direction, or an in angular direction such as may be caused by steering movements. Accordingly, an event may include at least one of an increase in speed, a decrease in speed, or a stop of the vehicle. In some examples, an event may include a single event including an increase in speed, a decrease in speed, or a stop. In other examples, an event may include multiple events such as multiple stops, increases in speed, or decreases in speed. In yet another example, an event may include a combination of events including two or more different event types, such as a stop and a subsequent increase in speed, or a decrease in speed and a subsequent stop. An event may include increases in speed or decreases in speed in the travel direction of the vehicle, in a lateral direction to that of the travel direction of the vehicle, or in an angular direction. By way of example, it may be detected that the vehicle is stopped or traveling at low-speed as part of an event (e.g., as the vehicle is approaching a stop sign). In response, the vehicle control system can cause the steering system of the vehicle to be manipulated. The vehicle control system can then determine a resulting friction between one or more tires of the vehicle and the driving surface. In another example, the braking system and/or propulsion system of the vehicle can be manipulated during events, and a resulting friction between one or more tires of the vehicle and the road surface can be determined.

More particularly, in some implementations, a vehicle computing system associated with a vehicle can initiate a wheel-based action during an event including an increase in vehicle speed, a decrease in vehicle speed, and/or a stop, and utilize resulting operational data in order to determine a friction. The wheel-based action can be initiated in some examples so as to minimize vehicle actions that may be perceptible to a passenger of the vehicle. Generally, a wheel-based action is associated with movement of at least one tire of the vehicle relative to the driving surface. By way of example, wheel-based actions may be associated with braking, accelerating, or steering, etc. The resulting operational data of a steering wheel-based action may include one or more of an input torque applied during steering, a steering force resulting from the input torque, and/or a wheel rotation resulting from the input torque. The resulting operational data of a braking wheel-based action may include one or more of an input braking force, a wheel torque resulting from an input braking force, and/or a wheel rotation resulting from the braking force. The resulting operational data of an increase in speed or propulsion wheel-based action may include one or more of an input propulsion force, a wheel torque associated with the propulsion force, and/or a wheel rotation associated with the propulsion force.

More particularly, in some implementations, the vehicle is an autonomous vehicle configured to automatically estimate a friction associated with a driving surface and use the friction estimation as part of autonomous operations. An autonomous vehicle can be a ground-based autonomous vehicle (e.g., car, truck, bus, etc.) or other types of vehicles. The autonomous vehicle can include a computing system that assists in controlling the autonomous vehicle. In some implementations, the autonomous vehicle computing system can include a perception system, a prediction system, a motion planning system, and a friction estimation system that cooperate to perceive the surrounding environment of the autonomous vehicle and determine one or more motion plans for controlling the motion of the autonomous vehicle accordingly. The autonomous vehicle computing system can include one or more processors as well as one or more non-transitory computer-readable media that collectively store instructions that, when executed by the one or more processors, cause the autonomous vehicle computing system to perform various operations as described herein.

In some implementations, the operational data is associated with one or more sensors of the vehicle. In particular, in some implementations, the perception system and/or the friction estimation system can receive sensor data from one or more sensors that are coupled to or otherwise included within the vehicle. As examples, the one or more sensors can include a Light Detection and Ranging (LIDAR) system, a Radio Detection and Ranging (RADAR) system, one or more cameras (e.g., visible spectrum cameras, infrared cameras, etc.), and/or other sensors. The sensor data from such sensors can include information that describes the location of objects within the surrounding environment of the vehicle. The sensor data may be used to generate detections, classifications, and/or predictions by one or more machine-learned models or other systems of a vehicle computing system for an autonomous vehicle, for example. The vehicle may also, or alternatively, include one or more other types of sensor(s) configured to acquire other types of sensor data. For example, a vehicle can include inertial measurement unit (IMU) sensors, pressure sensors, power sensors, contact strip sensors, suspension travel sensors, laser sensors, radar sensors, sound sensors, and/or any other suitable sensor. Accordingly, the sensor data acquired by the vehicle can also, or alternatively, include information that describes the position, movement (e.g., velocity, speed, acceleration, etc.), and/or forces experienced by the vehicle and/or its individual components (e.g., tires, axle, powertrain, brakes, steering system, etc.). Moreover, the sensor data may be used to determine data indicative a friction of a driving surface, as further described herein.

Operational data can be generated during an event associated with an increase in speed, a decrease in speed, and/or a stop, and may include the sensor data and/or data derived from the sensor data. The sensor data may be generated in association with one or more wheel-based actions initiated in response to a detected event. By way of example, the sensor data may include at least one of an input torque, a wheel rotation, or a steering force detected using one or more sensors in association with a steering wheel-based action. As another example, the sensor data may include at least one of a braking force, propulsion force, wheel rotation, or wheel torque detected using one or more sensors in association with a braking wheel-based action and/or propulsive wheel-based action.

According to example embodiments, a steering wheel-based action may be performed during a stop and an associated input torque, resulting wheel rotation, and/or resulting wheel torque determined. The input torque, resulting wheel rotation, and/or resulting wheel torque can be determined based at least in part on the output of one or more sensors during the steering wheel-based action. The vehicle computing system can determine a friction using at least one of the input torque, wheel rotation, and wheel torque. More particularly, the vehicle computing system may first detect an event such as a current stoppage of the vehicle or a future planned stop of the vehicle. While the vehicle is stopped, the vehicle computing system may initiate application of input torque at the steering system to cause rotational force between one or more tires of the vehicle and a driving surface. The input torque may be applied while the vehicle is stopped in order to avoid perception by a passenger of the vehicle. In other examples, the input torque may be applied while the vehicle is moving, but in a manner to reduce perception of the torque by a passenger. For instance, a quick steering rotation in one direction and back in the opposite direction may be applied using short movements so that a passenger may not notice the steering movements. In some examples, the input torque may be associated with a change (e.g., sudden change) in the swirl (e.g., a second derivative of the steering direction) associated with steering. In some examples, the input torque can be increased during application and a resulting wheel rotation and a steering force (e.g., rack force of a steering system) may be determined directly or indirectly using one or more sensors. Based on the input torque, wheel rotation, and/or steering force, a friction can be determined by the vehicle control system. In some examples, the input torque is an alignment torque representing the torque around a conceivable vertical axis through a wheel hub. In some examples, the input torque includes one or more of a driver input and a motor driven input for the steering system.

More particularly, in some examples, a maximum steering force and/or maximum wheel rotation may be used to determine a friction between one or more tires and a driving surface. For instance, the vehicle control system can analyze, in response to an increase in input torque, a change in the resulting steering force relative to a change in the resulting wheel rotation. Based on this analysis, at least one of a maximum steering force or maximum wheel rotation can be determined. The vehicle computing system can then calculate a friction based on the maximum steering force and/or maximum wheel rotation.

As another example, a braking wheel-based action may be performed during an acceleration event including a decrease in speed, and an associated input braking force, resulting wheel rotation, and/or resulting wheel torque determined based at least in part on the output of one or more sensors during the braking wheel-based action. The vehicle computing system can determine a friction using at least one of the braking force, wheel rotation, and wheel torque.

One or more input braking forces can be applied to one or more wheel assemblies as part of a braking wheel-based action. In some examples, a single braking force is applied to one wheel assembly. In other examples, a single braking force is applied to multiple wheel assemblies. In yet other examples, multiple braking forces may be applied. More particularly, in some examples, the vehicle computing system may utilize a differential braking force between wheel assemblies of the vehicle during deceleration in order to determine a friction while minimizing disruption to passengers. For instance, the vehicle computing system may detect an acceleration event including a current or future decrease in speed of the vehicle. As part of decelerating the vehicle, the vehicle computing system may initiate application of different braking forces to at least two or more wheel assemblies. For example, the vehicle computing system may apply a larger braking force to one wheel in order to cause a slip or slide of the corresponding tire relative to the driving surface. The larger braking force may be increased over time until a slip or slide of the tire is detected. Smaller braking forces can be applied to the other wheels so that a slide or slip is not experienced. In this manner a passenger may not perceive the slip or slide associated with the larger braking force. A resulting wheel rotation or wheel torque associated with the wheel assembly receiving the larger braking force can be determined directly or indirectly using one or more sensors. Based on the larger braking force, wheel rotation, and/or wheel torque, a friction can be determined by the vehicle control system.

As yet another specific example, a propulsion wheel-based action may be performed during an event and an associated input propulsion force, resulting wheel rotation, and/or resulting wheel torque determined based at least in part on the output of one or more sensors during the propulsion wheel-based action. The vehicle computing system can determine a friction using at least one of the propulsion force, wheel rotation, or wheel torque.

One or more input propulsion forces can be applied to one or more wheel assemblies as part of a propulsion wheel-based action. In some examples, a single propulsion force is applied to one wheel assembly. In other examples, a single propulsion force is applied to multiple wheel assemblies. In yet other examples, multiple propulsion forces may be applied. More particularly, in some examples, the vehicle computing system may utilize a differential propulsion force between wheel assemblies of the vehicle during acceleration in order to determine a friction while minimizing disruption to passengers. For instance, the vehicle computing system may detect an event including a current or future increase in speed of the autonomous vehicle. As part of accelerating the autonomous vehicle, the vehicle computing system may initiate application of different propulsion forces to at least two or more wheel assemblies. For example, the vehicle computing system may apply a larger propulsion force to one wheel in order to cause a slip or slide of the corresponding tire relative to the driving surface. The larger propulsion force may be increased over time until a slip or slide of the tire is detected. Smaller propulsion forces can be applied to the other wheels so that a slide or slip is not experienced. In this manner a passenger may not perceive the slip or slide associated with the larger propulsion force. A resulting wheel rotation or wheel torque associated with the wheel assembly receiving the larger propulsion force can be determined directly or indirectly using one or more sensors. Based on the larger propulsion force, wheel rotation, and/or wheel torque, a friction can be determined by the vehicle control system.

In accordance with some example embodiments, a future event of the vehicle can be detected based on at least one of map data, motion planning data, or route planning data associated with the vehicle. By way of example, the friction estimation system may determine that a future event has been planned for which a friction estimation can be determined without significant disruption to passengers of the vehicle. By way of example, the vehicle computing system can determine that the vehicle plans to stop at an intersection within an urban environment based at least in part on map data, a planned vehicle route, and/or the vehicle's motion planning data (e.g., in association with an autonomous vehicle). As such, the vehicle computing system can determine that a friction estimation may be calculated during one or more time periods that include decreasing the speed of the vehicle, the stoppage of the vehicle, and/or increasing the speed of the vehicle with respect to the intersection.

In accordance with other example embodiments, an ongoing event of the vehicle can be detected based at least in part on sensor data. By way of example, the friction estimation system may determine that a decrease in speed (e.g., the car braking in approach of an intersection or braking to avoid an object) is occurring based on sensor data associated with the braking system that indicates that a brake pressure is currently being applied.

In some implementations, a friction estimation may include a measure or value indicating the friction associated with a driving surface. The friction estimation measure or value may be determined using sensor data of the vehicle. In other implementations, the friction estimation does not include an actual measure or value indicating the friction associated with a driving surface. In such implementations, the friction estimation may include other data indicative of the friction associated with a driving surface. For instance, one or more threshold frictions can be used in some implementations. In such cases, the vehicle computing system may determine whether a friction associated with the driving surface satisfies the one or more thresholds, without determining an actual measure or value of friction associated with the driving surface. The friction estimation may be an indication that the friction satisfies or does not satisfy a threshold friction.

In some implementations, measures of confidence may be utilized by a vehicle computing system in association with a friction estimation. The measure of confidence can be utilized by the vehicle computing system as part of vehicle operations. By way of example, the vehicle computing system may assign a relatively high confidence measure to a friction estimation when the friction estimation is first generated. The confidence value can be lowered over time in order to represent that the driving surface is more likely to have changed the longer it has been since the friction estimation was first determined. In some examples, additional sensor data may be used to determine a confidence for a friction estimation. For instance, image data generated by one or more image sensors such as cameras may be analyzed to determine a similarity between a current driving surface and the driving surface for which the last friction estimation was performed. Higher confidence values can be assigned to the friction estimation if the current driving surface is more similar to the previous driving surface while lower confidence values can be assigned if the current driving surface is less similar.

The vehicle computing system can utilize friction estimations in various ways in association with non-autonomous and autonomous vehicles. For example, a non-autonomous vehicle may provide an indication of a friction estimation to a driver of the vehicle. Additionally and/or alternatively, a non-autonomous vehicle may communicate the friction estimation to other vehicles and/or other computing systems. Further, a non-autonomous vehicle may use a friction estimation as part of controlling the vehicle, such as to control advanced driver assistance systems.

The vehicle computing system can utilize friction estimations in various ways to control autonomous operations of an autonomous vehicle. For instance, the vehicle control system may generate motion plans based at least in part on the data indicative of the friction in some examples. In other examples, the vehicle control system may generate route or map plans based at least in part on the data indicative of the friction. In yet other examples, the vehicle control system may generate constraints associated with controlling the autonomous vehicle based on the data indicative of the friction. The constraints may include motion planning constraints, mapping constraints, or general operational constraints, for example. In some examples, controlling an autonomous vehicle based on data indicative of a friction of a driving surface can include implementing a motion plan and/or route plan that is based on the friction estimation. Implementing the motion plan may include translating a motion plan by a vehicle controller and/or interface and sending one or more signals to the control systems (e.g., acceleration, braking, steering, etc.).

As an example, friction estimations may be used as part of generating a motion plan for the autonomous vehicle. For instance, if it is determined that the friction of a current driving surface does not satisfy one or more thresholds, the vehicle control system may utilize lower or more strict motion planning constraints. These lowered motion planning constraints may provide for a larger distance between the autonomous vehicle and surrounding vehicles, a lower top speed, a lower acceleration rate, a lower speed during turns, a longer allocated distance for stopping, and/or any other suitable constraint.

As another example, friction estimations may be used as part of mapping, such as in generating a route plan for a non-autonomous or autonomous vehicle. For instance, if it is determined that the friction of a current driving surface does not satisfy one or more thresholds, the vehicle control system may utilize lower or more strict route planning constraints. These lowered route planning constraints may provide for travel on roads with lower grades (e.g., pitch), roads with lower amounts of traffic, roads that have more recently been cleared from snow, etc., and any other suitable route planning constraint.

As yet another example, friction estimations may be used as part of general autonomous vehicle operations, such as in generating operational plans for the autonomous vehicle. For instance, if it is determined that the friction of a current driving surface does not satisfy one or more thresholds, the vehicle control system may utilize lowered or more strict operational constraints. These lowered operational constraints may provide that the autonomous vehicle is to stop and not perform autonomous operations if the friction of the driving surface does not satisfy one or more thresholds.

According to one example aspect of the present disclosure, a computing system is provided that includes one or more processors, and one or more non-transitory computer-readable media that collectively store instructions that, when executed by the one or more processors, cause the computing system to perform operations. The operations include detecting a stop associated with a vehicle, initiating a steering action of the vehicle during the stop. The steering action is associated with movement of at least one tire of the vehicle relative to a driving surface. The operations include obtaining operational data associated with the steering action during the stop of the vehicle, determining a friction associated with the driving surface based at least in part on the operational data associated with the steering action, and generating data indicative of the friction associated with the driving surface.

According to one example aspect of the present disclosure, a computing system is provided that includes one or more processors, and one or more non-transitory computer-readable media that collectively store instructions that, when executed by the one or more processors, cause the computing system to perform operations. The operations include detecting an event including at least one of an acceleration, deceleration, or a stop associated with an autonomous vehicle. The operations include obtaining, in response to detecting the event, operational data associated with the autonomous vehicle during the event. The operations further include, determining, based at least in part on the operational data, data indicative of a friction associated with a surface upon which the autonomous vehicle is traveling during the event. The operations include controlling the autonomous vehicle based at least in part on the data indicative of the friction associated with the surface.

According to one example aspect of the present disclosure, an autonomous vehicle is provided that includes one or more processors, and one or more non-transitory computer-readable media that collectively store instructions that, when executed by the one or more processors, cause the one or more processors to perform operations. The operations include detecting an event associated with an autonomous vehicle. The operations further include obtaining operational data associated with the autonomous vehicle during the event. The operations include, determining, based at least in part on the operational data, data indicative of a friction associated with a surface upon which the autonomous vehicle is traveling during the acceleration event. The operations further include generating at least one constraint for the autonomous vehicle based at least in part on the data indicative of the friction associated with the surface.

According to one example aspect of the present disclosure, a computer-implemented method is provided that includes detecting (e.g., by the vehicle computing system, etc.) an acceleration event associated with an autonomous vehicle. The method includes obtaining operational data associated with the autonomous vehicle during the acceleration event. The method includes determining, based at least in part on the operational data, data indicative of a friction associated with a surface upon which the autonomous vehicle is traveling during the acceleration event. The method includes determining at least one wheel-based action for the autonomous vehicle based at least in part on the data indicative of the friction associated with the surface.

The systems and methods of the present disclosure provide a number of technical effects and benefits, particularly in the areas of vehicles and computing technology. For instance, a vehicle in accordance with embodiments of the disclosed technology may generate data indicative of a friction associated with a driving surface in order to improve vehicle operations and/or to provide indications of the friction to a driver. By way of example, an autonomous vehicle may utilize friction data to generate improved motion plans for the autonomous vehicle, to generate improved route or mapping plans for the autonomous vehicle, and/or to improve the general operation of the autonomous vehicle. More specifically, friction data may be used to control movement of the autonomous vehicle and/or routes upon which the autonomous vehicle travels. By utilizing friction estimations, the autonomous vehicle may be able to more safely operate by tailoring movement and control of the autonomous vehicle based on a determined friction of the surface upon which the vehicle is currently traveling. Additionally, the autonomous vehicle may detect particular events during which a friction estimation may be determined without significant disruption to passengers of the autonomous vehicle.

The systems and methods described herein may provide a particular technical benefit to vehicle computing systems of vehicles. In particular, a vehicle computing system can initiate a friction determination in response to detected events. The vehicle computing system can initiate friction determinations using techniques that may minimize disruption to passengers of the vehicle (e.g., by taking such measurements at points in time that would typically coincide with the vehicle's decrease in speed, stoppage, increase in speed, etc.). More specifically, the vehicle computing system can initiate one or more wheel-based actions so that sensor data associated with the wheel-based actions can be obtained. The vehicle computing system can then use the operational data to determine a friction associated with the driving surface. The vehicle computing system can then provide an indication of the friction such as an alert to a driver, transmit data indicative of the friction to one or more other computing devices, and/or use the friction estimation as part of autonomous vehicle operations. By way of example, the vehicle computing system can utilize a friction estimation as part of motion planning, route planning, or other operations associated with the autonomous vehicle.

Although many examples are described herein with respect to autonomous vehicles, the disclosed technology is not limited to autonomous vehicles. Any vehicle may determine friction estimations in association with a driving surface and use the friction estimations as part of vehicle operations in accordance with embodiments of the present disclosure. For example, a non-autonomous vehicle may use sensor data, map data, route plan data, or other data to detect an event such as a stop. For instance, a non-autonomous vehicle may use sensor data to identify a stop sign and detect a future acceleration event including a stop at a location proximate to the stop sign. As another example, a non-autonomous vehicle may use map data or route plan data to identify a stop sign or intersection where the vehicle will stop. The vehicle may initiate a wheel-based action during the stop and determine a friction associated with the driving surface based on operational data associated with the wheel-based action.

Non-autonomous vehicles may use friction estimations in various ways as part of vehicle operations. For instance, a non-autonomous vehicle may provide an indication (e.g., visual, audible, or other) of a friction estimation using a user interface to inform a driver of the friction. A vehicle may transmit a signal including data indicative of a friction estimation to one or more remote computing devices, such as a server or a vehicle computing system of another vehicle. As another example, a non-autonomous vehicle may use data indicative of friction as part of advanced driver assistance systems. For instance, a non-autonomous vehicle may use a friction estimation as part of vehicle operations that include controlling a braking system, a propulsion system, and/or a steering system. More particularly, the vehicle may provide and/or adjust braking forces, propulsion forces, and/or steering forces based on a friction associated with a driving surface. As a specific example, a vehicle may decrease or otherwise modify the amount of a braking force applied to a wheel assembly in response to a user braking input based on a low friction driving surface. For instance, the braking system may generate a smooth and gradually increasing braking force rather than a sudden increase in braking force as indicated by user input. As another example, a vehicle may decrease or otherwise modify a propulsion force in response to a user propulsion input. For instance, the propulsion system may generate a smooth and gradually increasing propulsion force rather than a sudden increase in propulsion force.

According to example embodiments, a computer system is provided that is configured to perform operations in association with a vehicle. The operations can include detecting an event associated with a vehicle. The event may be a current or future stop of the vehicle in some examples. The operations can include initiating a wheel-based based action based on detecting the event. The wheel-based action can be performed during the event and operational data associated with the vehicle during the event can be obtained. For example, the vehicle can initiate a steering movement and obtain data indicative of a rack force, steering angle, or other operational data in association with the steering movement while the vehicle is stopped. The vehicle can determine, based at least in part on the operational data, data indicative of a friction of a driving surface. The vehicle can perform one or more subsequent vehicle actions based at least in part on the operational data. The vehicle actions may include generating a motion plan for an autonomous vehicle or controlling an advanced driver assistance system of a non-autonomous vehicle, for example.

With reference now to the Figures, example embodiments of the present disclosure will be discussed in further detail. FIG. 1 depicts a block diagram of an example autonomous vehicle 10 according to example embodiments of the present disclosure. The autonomous vehicle 10 is capable of sensing its environment and navigating without human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft, rail-based vehicles, etc.).

The autonomous vehicle 10 includes one or more sensors 101, a vehicle computing system 102, and one or more vehicle controls 107. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment. The vehicle computing system 102 can control the one or more vehicle controls 107 to operate the autonomous vehicle 10 according to the motion path.

The vehicle computing system 102 includes a computing device 110 including one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause vehicle computing system 102 to perform operations.

As illustrated in FIG. 1, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the autonomous vehicle 10. The positioning system can be any device or circuitry for analyzing the position of the autonomous vehicle 10. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the autonomous vehicle 10 can be used by various systems of the vehicle computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10.

The one or more sensors 101 may additionally include sensors associated with measuring parameters, characteristics, environmental data, or other aspects of the autonomous vehicle and associated hardware. For example, inertial measurement unit (IMU) sensors, pressure sensors, power sensors, contact strip sensors, suspension travel sensors, laser sensors, radar sensors, sound sensors, and/or any other suitable sensor may be used. The sensor data acquired by the autonomous vehicle can include information that describes the position, movement (e.g., velocity, speed, acceleration, etc.), and/or forces experienced by the autonomous vehicle and/or its individual components (e.g., tires, axle, powertrain, brakes, steering system, etc.). The autonomous vehicle may include sensors that measure an input steering force such as an input torque, a resulting alignment torque or rack force of an input steering force, a steering displacement such as a wheel rotation or steering angle. The autonomous vehicle may include sensors that measure an input braking force applied by an electric motor of the braking system and/or a wheel torque associated with an input braking force. The autonomous vehicle may include sensors that measure an input propulsive force to a shaft, drive, or wheel assembly, a wheel torque associated with an input propulsive force. The autonomous vehicle may include sensors such as encoders that measure a degree of rotation of wheels, etc.

Sensor data is one example of operational data associated with an autonomous vehicle. Operational data may additionally or alternatively include data derived from sensor data, such as a force, distance, or angle that is determined based on sensor data. The sensor data may be used to determine data indicative a friction of a driving surface, as further described herein.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object as described. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine one or more motion plans for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine a motion plan for the autonomous vehicle 10 that best navigates the autonomous vehicle 10 relative to the objects at their current and/or future locations.

As one example, in some implementations, the motion planning system 105 can evaluate one or more cost functions for each of one or more candidate motion plans for the autonomous vehicle 10. For example, the cost function(s) can describe a cost (e.g., over time) of adhering to a particular candidate motion plan and/or describe a reward for adhering to the particular candidate motion plan. For example, the reward can be of opposite sign to the cost.

The motion planning system 105 can provide the optimal motion plan to a vehicle controller 106 that controls one or more vehicle controls 107 (e.g., actuators or other devices that control gas flow, steering, braking, etc.) to execute the optimal motion plan. The vehicle controller can generate one or more vehicle control signals for the autonomous vehicle based at least in part on an output of the motion planning system.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

In various implementations, one or more of the perception system 103, the prediction system 104, and/or the motion planning system 105 can include or otherwise leverage one or more machine-learned models such as, for example convolutional neural networks.

Vehicle computing system 102 includes a friction estimation system 150 in accordance with example embodiments of the disclosed technology. Friction estimation system 150 is configured to automatically estimate a friction force associated with a driving surface upon which an autonomous vehicle is driving. Friction estimation system 150 can generate friction data including estimates of friction forces and provide the generated friction data to systems such as perception system 103, prediction system 104, and/or motion planning system 105 for use in autonomous vehicle operations. Friction estimation system 150 can receive sensor data and map data from sensors 101 and positioning system 111, respectively. For example, friction estimation system 150 can receive map data and/or motion planning data in order to determine acceleration events for which a friction estimation will be performed in some examples. During the acceleration events, friction estimation system 150 can generate friction data 152 including friction estimations based on sensor data from sensors 101. Friction estimation system 150 can detect acceleration events associated with the autonomous vehicle and obtain operational data such as sensor data associated with the autonomous vehicle during the acceleration event. Based on the operational data, the friction estimation system 150 can determine data indicative of a friction associated with a surface upon which the autonomous vehicle is traveling during the acceleration event. Friction estimation system 150 can provide data indicative of a friction to one or more additional systems for controlling the autonomous vehicle based on the data indicative of the friction associated with the surface.

Although FIG. 1 depicts an autonomous vehicle, a non-autonomous vehicle in accordance with the disclosed technology may include similar components. For example, a non-autonomous vehicle may include the depicted components but may not necessarily include a perception system 103, a prediction system 104, and/or a motion planning system 105. In some embodiments, however, a non-autonomous vehicle may include one or more of a perception system 103, a prediction system 104, and/or a motion planning system 105.

Figure 2:
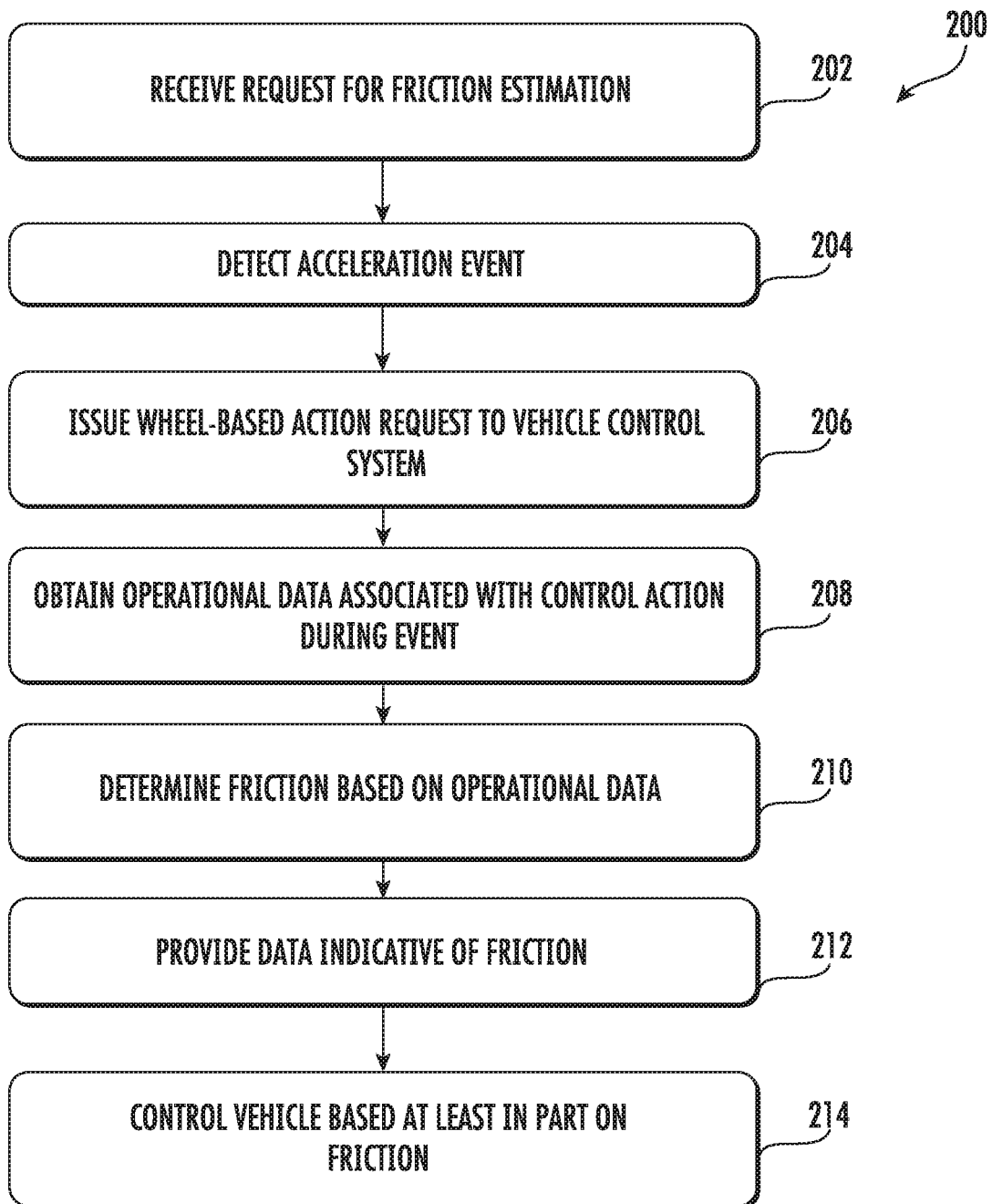
FIG. 2 depicts a flowchart diagram of an example process of determining a friction estimation and controlling an autonomous vehicle using the friction estimation according to example embodiments of the present disclosure.

FIG. 2 is a flowchart diagram depicting an example process 200 of generating data indicative of a friction of a driving surface and controlling a vehicle based at least in part on the data indicative of the friction. One or more portions of process 200 (and other processes described herein) can be implemented by one or more computing devices such as, for example, the computing devices 110 within vehicle computing system 102 of FIG. 1, or example computing system 1000 of FIG. 15. Moreover, one or more portions of the processes described herein can be implemented as an algorithm on the hardware components of the devices described herein (e.g., as in FIGS. 1 and 15) to, for example, generate data indicative of a friction of a driving surface upon which an vehicle is traveling. In example embodiments, process 200 may be performed by a friction estimation system 150 of vehicle computing system 102.

At 202, a request is received for a friction estimation in association with an autonomous vehicle. In some embodiments, a request may be received by a vehicle computing system 102, or more particularly, by a friction estimation system 150 of a vehicle computing system 102. One or more components of an autonomous driving system, such as a perception system 103, prediction system 104, motion planning system 105, and/or vehicle controller 106 may issue a request for a friction estimation in accordance with embodiments of the disclosed technology.

At 204, an event is detected. In example embodiments, friction estimation system 150 may detect an event in response to one or more signals from various components of the vehicle computing system. For example, friction estimation system 150 may detect an event in response to sensor data from one or more sensors 101. Friction estimation system 150 may detect a stop, a decrease in speed and/or an increase in speed by the vehicle as an event. For example, friction estimation system 150 may use imagery or other sensor data to identify a stop sign, yield sign, or other sign or object in an environment external to the vehicle indicating a future event. In another example, friction estimation system 150 may detect an event in response to motion planning data from motion planning system or route plan data. For instance, friction estimation system 150 may detect an event in response to motion planning data that indicates a planned stop or decrease in speed, or a planned increase in speed by an autonomous vehicle. As yet another example, friction estimation system 150 may detect an event in response to motion planning data or other sensor data indicating a rotation of the steering wheel of the autonomous vehicle.

At 206, a wheel-based action request is issued to a vehicle control system of the vehicle. In example embodiments, friction estimation system 150 may issue a wheel-based action request to vehicle controller 106. In turn, vehicle controller 106 may issue one or more requests and/or commands to an appropriate vehicle control to initiate the wheel-based action. For example, friction estimation system 150 may issue a request for a braking action, a propulsion action, and/or a steering action. More particularly, the wheel-based action may be a steering wheel-based action performed during a stop, or while the vehicle is moving and in a manner intended to be non-perceptible by user. As another example, friction estimation system 150 may issue a request for a propulsion wheel-based action during a detected acceleration event including an increase in speed. As yet another example, friction estimation system 150 may issue a request for a braking wheel-based action during a detected acceleration event including a decrease in speed.

At 208, operational data associated with the wheel-based action during the detected acceleration event is obtained. The operational data may be obtained by friction estimation system 150 from one or more sensors 101, and/or other components of the vehicle computing system, such as perception system 103, prediction system 104, and/or motion planning system 105. Examples of operational data may include data indicative of one or more of an input steering force, a wheel rotation, a wheel torque, a rack force, an alignment torque, etc. associated with a steering wheel-based action. Other examples may include data indicative of an input braking force, a wheel rotation, a wheel torque, etc. associated with a braking wheel-based action. Another example of operational data may include data indicative of an input propulsion force, a wheel rotation, a wheel torque, etc. associated with a propulsion wheel-based action. etc.

At 210, a friction is determined based on the operational data obtained at 208. In example embodiments, the friction may be a friction estimation. By way of example, a friction in association with a steering wheel-based action may be determined based on the input steering force applied to the steering system, and a wheel rotation and/or a torque (e.g., alignment torque, rack force, etc.) that results from the input steering force. More particularly, a maximum steering force and/or maximum wheel rotation may be used to determine a friction associated with the interaction of one or more tires and a driving surface. A friction in association with a braking wheel-based action may be determined based on an input braking force applied to the braking system, a resulting wheel rotation, and/or a resulting wheel torque associated with the input braking force. A friction in association with a propulsion wheel-based action may be determined based on an input propulsive force applied to the propulsion system, a resulting wheel rotation, and/or a resulting wheel torque associated with the input propulsive force.

At 212, data indicative of the friction determined at 210 can be provided. By way of example, friction estimation system may provide an indication of the one or more friction estimations to a driver by way of a user interface of the vehicle. As another example, friction estimation system 150 may provide data indicative of the one or more friction estimations to a remote computing system such as a remote server or another vehicle. In some examples, friction estimation system 150 may provide one or more friction estimations to perception system 103, prediction system 104, and/or motion planning system 105. The friction estimation system 150 may provide data indicative of a friction associated with a driving surface.

At 214, the vehicle is controlled based at least in part on the data indicative of the friction of the driving surface. By way of example, motion planning system 105 may generate one or more motion plans based on the estimated friction of the driving surface. As another example, the vehicle control system may generate route or map plans based at least in part on the friction estimation. As yet another example, the vehicle control system may generate constraints associated with controlling the vehicle based at least in part on the data indicative of the friction. The constraints may include motion planning constraints, mapping constraints, and/or general operational constraints. In another example, the vehicle control system may control an advanced driver-assistance system or other system of a non-autonomous vehicle based at least in part on the friction of the driving surface. It is noted that the operation(s) at 214 is optional. For example, data indicative of the estimated friction can be provided at 212 without controlling the vehicle based on the friction.

In some examples, the vehicle control system may generate motion plans based at least in part on the data indicative of the friction. Controlling an autonomous vehicle based on data indicative of a friction of a driving surface can include implementing a motion plan and/or route plan that is based on the friction. Implementing the motion plan may include translating a motion plan by a vehicle controller and/or interface and sending one or more signals to the control systems (e.g., acceleration, braking, steering, etc.).

Various thresholds may be utilized with friction data as part of controlling an autonomous vehicle. The vehicle control system may utilize lower or more strict motion planning constraints in response to lower friction estimates. These lowered motion planning constraints may provide for a larger distance between the autonomous vehicle and surrounding vehicles, a lower top speed, a lower acceleration rate, a lower speed during turns, a longer allocated distance for stopping, and/or any other suitable constraint. Friction data may be used as part of mapping, such as in generating a route plan for the autonomous vehicle. The vehicle control system may utilize lower or more strict route planning constraints in response to a driving surface having a friction that does not satisfy one or more thresholds. These lowered route planning constraints may provide for travel on roads with lower grades (e.g., pitch), roads with lower amounts of traffic, roads that have more recently been cleared from snow, etc., and any other suitable route planning constraint. Friction data may be used as part of general autonomous vehicle operations, such as in generating operational plans for the autonomous vehicle. For instance, the vehicle control system may utilize lowered or more strict operational constraints in response to a driving surface having a friction that does not satisfy one or more thresholds. These lowered operational constraints may provide that the autonomous vehicle is to stop and not perform autonomous operations if the friction of the driving surface does not satisfy one or more thresholds.

As a specific example, an autonomous vehicle may utilize three or more operational modes dependent upon friction estimations. If a friction of a driving surface satisfies a first threshold (e.g., coefficient of friction greater than or equal to 0.3), normal driving operations may be utilized. If the friction satisfies a second threshold (coefficient of friction greater than or equal to 0.2) but fails to satisfy the first threshold, increased operational, mapping, and/or general operational constraints may be used. If the friction fails to satisfy the second threshold, the vehicle can be limited or inhibited from autonomous operations. Other numbers and examples of constraints and/or thresholds may be used in accordance with example embodiments.

Figure 3:
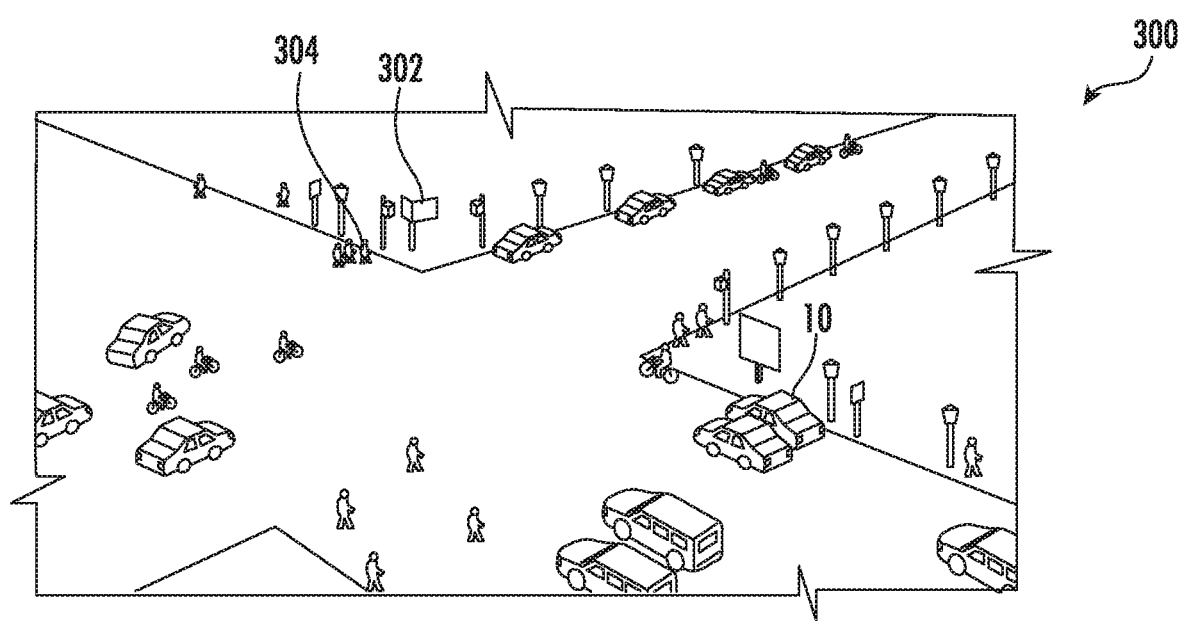
FIG. 3 depicts an example environment through which an autonomous vehicle may travel according to example embodiments of the present disclosure.

FIG. 3 depicts an example outdoor environment 300, illustrating the implementation of friction estimations in association with events in accordance with example embodiments of the present disclosure. Outdoor environment 300 may include one or more travelways (e.g., intersecting roadways). The scene illustrated in the outdoor environment 300 can include one or more static and/or dynamic objects (e.g., pedestrians, vehicles, bicyclists, sidewalks, lampposts, signage, etc.). The environment 300 can be an environment in which a vehicle is and/or will be travelling. The environment 300 shown in FIG. 3 is presented by way of example only and is not intended to be limiting.

The vehicle computing system 102 can obtain sensor data associated with the environment. For instance, the vehicle computing system 102 can obtain sensor data including two-dimensional and/or three-dimensional data associated with an environment 300. For example, three-dimensional data can include a plurality of points. The plurality of points can be included within a three-dimensional point cloud associated with the environment 300.

A vehicle may use sensor data and/or motion planning data relating to environment 300 to plan a wheel-based action to determine a friction associated with a driving surface. For example, perception system 103 may detect from sensor data a traffic signal 302 and/or one or more pedestrians 304. Motion planning system 105 may generate one or more motion plans based on the detected traffic signal 302 and/or pedestrians 304. The one or more motion plans may include decreasing the speed of the autonomous vehicle to comply with a traffic signal indicating that the vehicle must stop, or decreasing the speed of the autonomous vehicle to allow the pedestrians 304 to cross the road. As another example, the one or more motion plans may include increasing the speed of the autonomous vehicle in response to a traffic signal indicating that the vehicle may proceed from or through an intersection.

Friction estimation system 150 may detect an event such as decreasing the speed of the autonomous vehicle in response to traffic signal 302 and/or pedestrians 304. In response, friction estimation system 150 may issue one or more wheel-based action requests in order to determine a friction during the detected acceleration event. For example, friction estimation system 150 may issue a steering wheel-based action request in order to determine a friction while the vehicle 10 is stopped in response to traffic signal 302 and/or pedestrians 304. As another example, friction estimation system may issue a braking wheel-based action request in order to determine a friction of the driving surface as the vehicle is decreasing speed in response to the traffic signal and more pedestrians 304. Similarly, friction estimation system 150 may issue a propulsion wheel-based action request in order to determine a friction of the driving surface as the vehicle increases in speed in response to the traffic signal indicating that vehicle may pass and/or in response to the one or more pedestrians 304 clearing the travelway.

Figure 4:
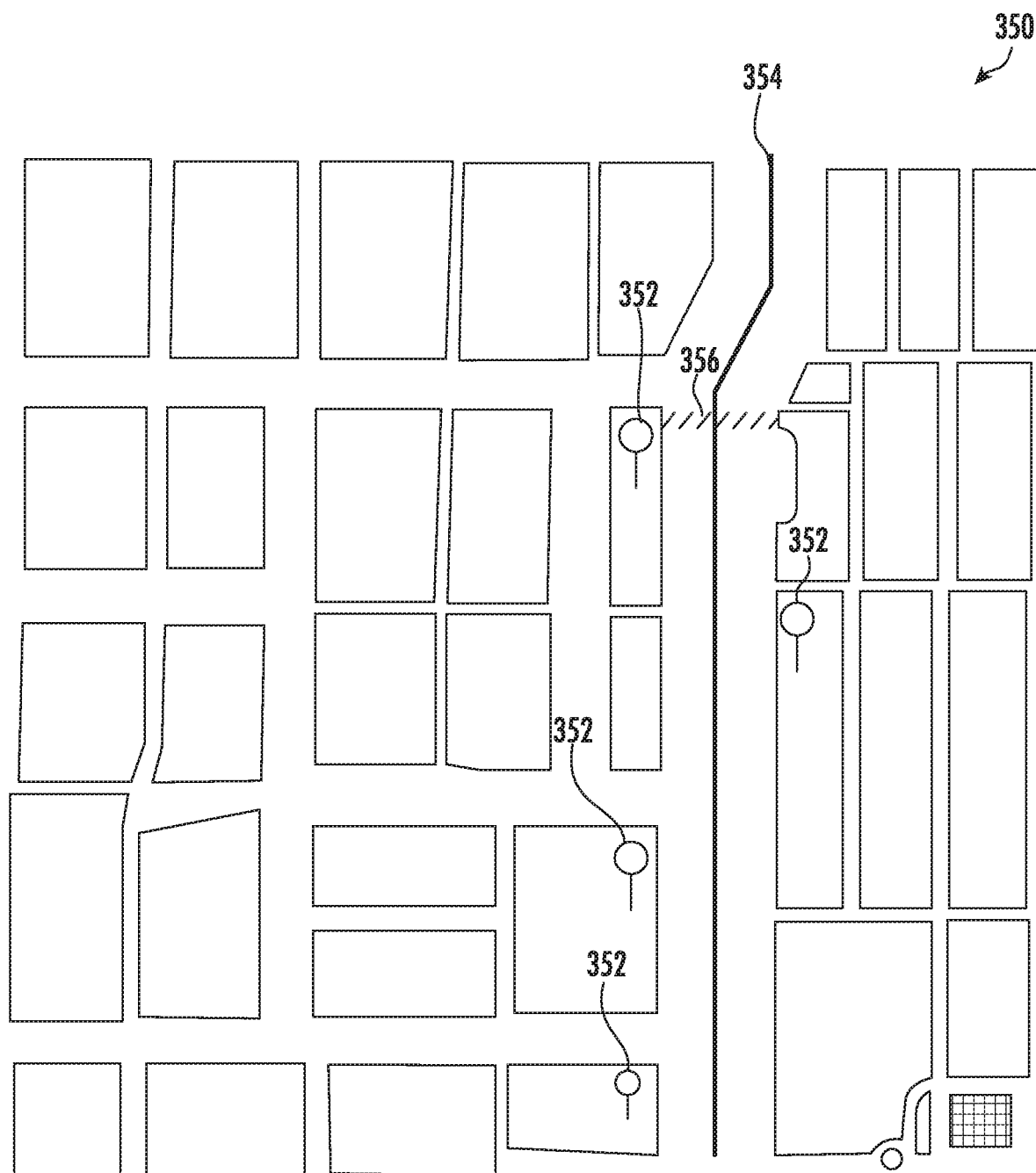
FIG. 4 depicts an example environment through which an autonomous vehicle may travel according to example embodiments of the present disclosure.

FIG. 4 depicts another example outdoor environment 350 and generating data indicative of friction of a driving surface based on detected acceleration events. The outdoor environment 350 can include one or more travelways (e.g., intersecting roadways). The scene illustrated in the outdoor environment 350 can include one or more static and/or dynamic objects (e.g., pedestrians, vehicles, bicyclists, sidewalks, lampposts, signage, etc.) such as traffic signals 352. Friction estimation system 150 may initiate wheel-based actions in order to determine friction estimations of a travelway at planned intervals based on environment 350. More particularly, the wheel-based actions may be initiated in a manner to minimize or eliminate perception of the wheel-based actions by a passenger of the autonomous vehicle.

More particularly, in the example of FIG. 4, the vehicle computing system 102 may generate one or more motion plans causing an autonomous vehicle to travel a path roughly as shown at 354. The vehicle computing system 102 may determine that the autonomous vehicle is to stop at one or more of the traffic signals 352. Based on detecting acceleration events in association with stopping and or proceeding from a stop in association with one or more of the traffic signals, the friction estimation system 150 can plan wheel-based actions in an effort to minimize any disruption to passengers of the autonomous vehicle. For instance, the vehicle computing system may initiate a steering wheel-based action in response to the autonomous vehicle stopping in response to one or more of the traffic signals. As another example, the vehicle computing system may initiate a braking wheel-based action in response to the autonomous vehicle decreasing speed in approach of a traffic signal. As yet another example, the vehicle computing system may initiate a propulsion wheel-based action in response to the autonomous vehicle increasing speed as it proceeds from a stop position at a traffic signal. Further still, the vehicle computing system may initiate a wheel-based action in response to a detected acceleration event associated with a crosswalk 356.

Figure 5:
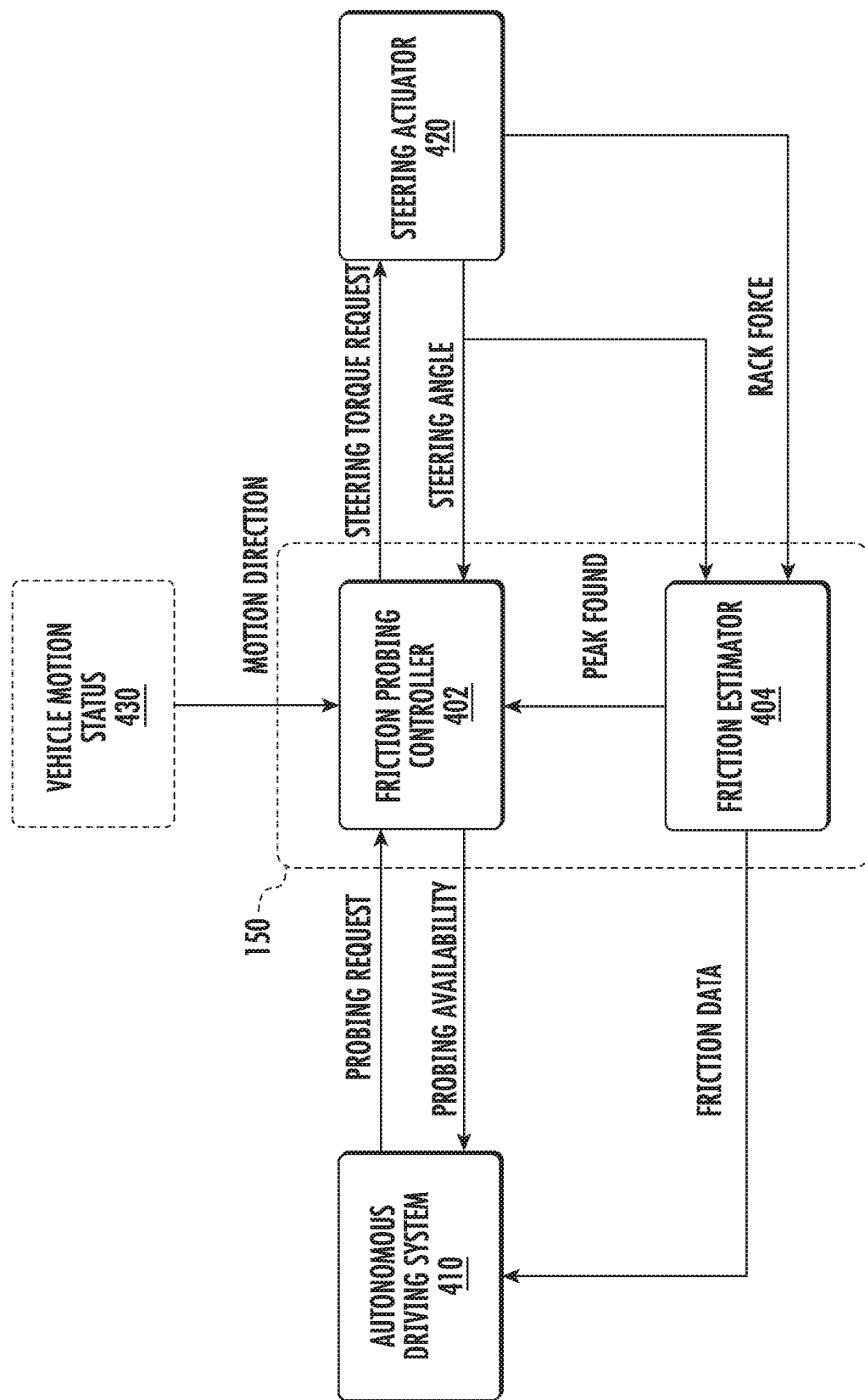
FIG. 5 depicts a block diagram of an example vehicle computing system and steering system according to example embodiments of the present disclosure.

FIG. 5 is a block diagram depicting additional details of friction estimation system 150 and the generation of friction estimations in accordance with example embodiments of the disclosed technology. In the example of FIG. 5, friction estimation system 150 includes a friction probing controller 402 and a friction estimator 404. Friction probing controller 402 is in communication with the autonomous driving system, depicted generally as autonomous driving system 410. In another example (not depicted) friction probing controller 402 can be in communication with a vehicle control system of a non-autonomous vehicle rather than an autonomous driving system 410 of an autonomous vehicle. Autonomous driving system 410 may include a perception system 103, a prediction system 104, and/or a motion planning system 105. Friction probing controller 402 is additionally in communication with a vehicle motion status component 430 and a steering actuator 420. It will be appreciated that the components of friction estimation system 150 and the external components are provided by way of example only. For example, friction probing controller 402 may be in communication with any number of vehicle controls and/or vehicle controller 106.

An example of signals transmitted between the various components of the autonomous vehicle as part of a friction estimation process are shown in FIG. 5. One or more components of autonomous driving system 410 (or vehicle control system of a non-autonomous vehicle) may issue a probing request to friction probing controller 402. A probing request is one example of a request for a friction estimation, however, it will be appreciated that other types of request may be utilized. In example embodiments, the autonomous driving system may issue a request for a friction estimation or measurement when uncertainty about the friction associated with a driving surface is high and knowledge of friction is needed in order to provide safe and convenient travel.

Friction probing controller 402 may reply to autonomous driving system 410 or a vehicle control system of a non-autonomous vehicle with an indication of whether there is probing availability to measure or otherwise estimate friction associated with the driving surface. In some examples, there is probing availability when friction probing controller 402 determines that there is a future or ongoing acceleration event. Vehicle motion status component 430 can provide an indication of whether the vehicle is moving or is at a standstill in some examples as part of determining whether there is probing availability. In some examples, probing availability may only be present when the vehicle is at a standstill. In other examples, however, probing availability may be present at other times such as when the vehicle is decreasing speed and/or increasing speed. If the motion direction received from vehicle motion status component 430 is appropriate for performing a friction estimation, friction probing controller 402 may reply to autonomous driving system with an indication of probing availability. If however, the motion direction is not appropriate for a friction estimation process, friction probing controller 402 can indicate probing unavailability to autonomous driving system 410.

In response to determining that a friction estimation process can be performed, friction probing controller 402 issues a steering torque request to steering actuator 420. Steering actuator 420 as one example of a vehicle control 107. A steering torque request is one example of a request for a wheel-based action. The steering torque request may specify an input torque to be applied to the steering system in some examples. More particularly, the steering torque request may specify a ramp up of the steering torque or an increase in steering torque from a low value to a high value. In some examples, the steering torque request may be issued to the steering actuator requesting an increase in torque until a peak friction is measured or otherwise found. At that point, the steering torque request may ramp down the steering torque until it reaches zero. In some examples, if the steering actuator has a problem with actuation in response to the steering torque request, the probing availability can be false.

In response to the steering torque applied by steering actuator 420, the steering actuator 420 provides an indication of the resulting steering displacement such as wheel steering angle. For example, data indicative of the resulting wheel steering angle can be provided back to friction probing controller 402 as well as to friction estimator 404. Additionally, a rack force can be measured by one or more sensors associated with the steering actuator and an indication of the rack force provided to friction probing controller 402 and friction estimator 404. In some examples, the rack force is an alignment torque associated with the steering system.

Friction estimator 404 can obtain the rack force data and the steering angle data and determine a peak friction associated with the steering wheel-based action. Generally, higher levels of friction will be determined in response to higher levels of peak rack force and larger steering angles applied to reach the peak rack force level. Similarly, lower levels of friction will be determined in response to lower levels of peak rack force and lower steering angles applied to reach the peak rack force level. More details describing the determination of a friction based on rack force and steering angle are provided hereinafter.

Once a peak friction is found, friction estimator 404 provides a signal to friction probing controller 402 that the steering torque request can be ended. Friction estimator 404 provides to autonomous driving system 410 data indicative of the friction measured using the wheel-based action A detailed explanation of one example for determining a friction or friction estimation in association with a driving surface using a steering wheel-based action is provided with respect to graph 502 depicted FIG. 6. Generally speaking, a force generated in association with a tire's contact patch with a driving surface is different depending on the friction of the driving surface. The vehicle steering system may be associated with an alignment torque which is equal to the torque around a conceptual vertical axis through a wheel hub. It can be observed that generally when the alignment torque is lower the friction of a driving surface is lower. Typically, the expected alignment torque varies for different steering angles and friction levels.

Figure 6:
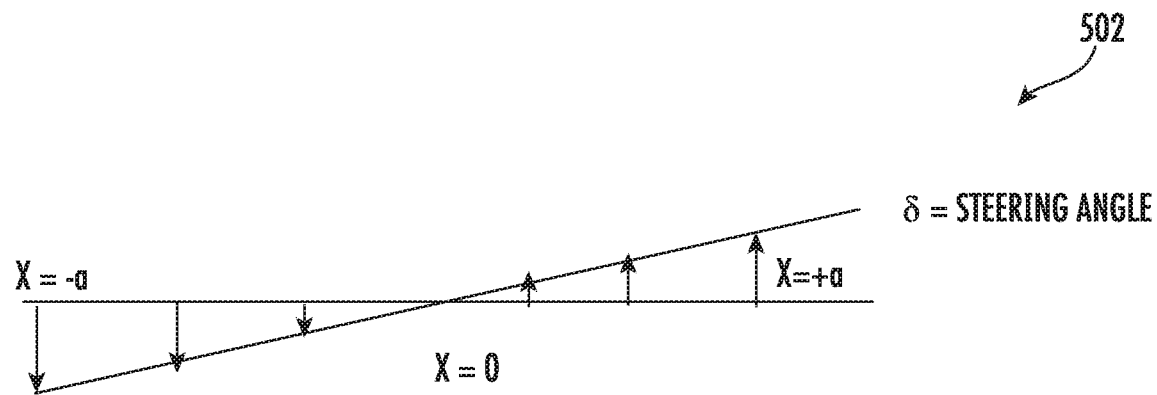
FIG. 6 depicts a graph illustrating a relationship between steering angle and lateral displacement of tire bristles according to example embodiments of the present disclosure.

Consider a graph as shown in FIG. 6 showing a steering angle $\delta$ as a function of the lateral displacement x of the bristles of a tire in a tire patch area, where the length of the tire patch area is equal to 2a. If one assumes that the kingpin axis goes through the center of the wheel hub, an equation for alignment torque can be defined. It can first be assumed that full adhesion is present (friction is infinitely high and no bristles of the tire are sliding). When the tire is steered with a steering angle $\delta$, the tire responds as a torsional spring. Equation 1 sets forth the lateral deflection v(x) and Equation 2 sets forth the Lateral force distribution $\tau_y(x)$.

$$v(x) = x \tan \delta \quad \text{Equation 1}$$

$$\tau_y(x) = c_{py} x \tan \delta \quad \text{Equation 2}$$

In the equations, $\delta$ is the steering angle, x is the lateral displacement of the bristles, and $c_{py}$ is the laternal bristle stiffness (N/M)/m.

With Equations 1 and 2 established, the alignment torque $M_z$ can be defined as set forth in Equation 3.

$$M_z = \int_{-a}^{a} \tau_y(x) x \, dx = \int_{-a}^{a} c_{py} x^2 \tan \delta \, dx = \tfrac{2}{3} c_{py} a^3 \tan \delta \quad \text{Equation 3}$$

Equation 3 provides an expression for alignment torque $M_z$ that is dependent upon steering angle $\delta$, the tire stiffness $c_{py}$, and the tire contact patch (length equal to 2a).

Figure 7:
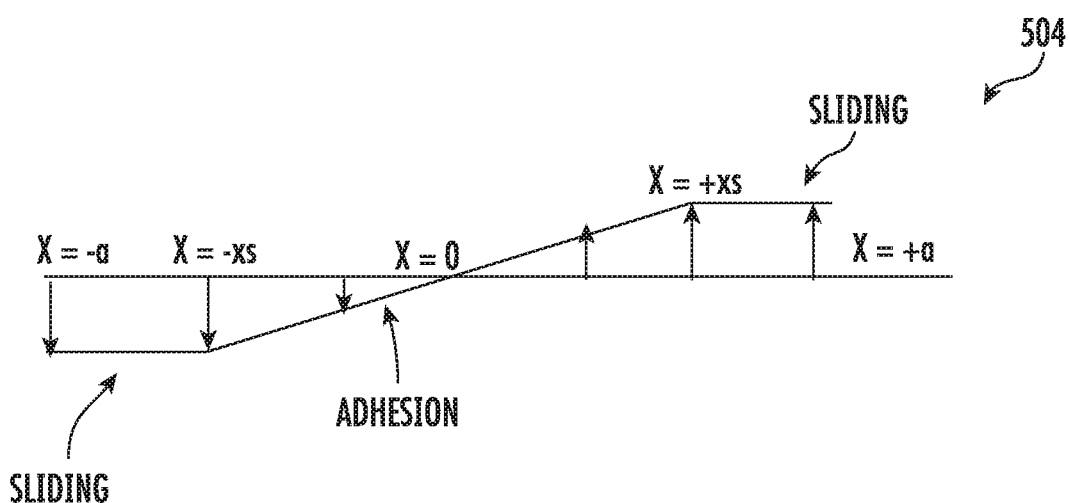
FIG. 7 depicts a graph illustrating a relationship between steering angle and lateral displacement of tire bristles including a saturation condition according to example embodiments of the present disclosure.

FIG. 7 depicts another graph 504 of steering angle $\delta$ as a function of lateral displacement x where it is not assumed that friction is infinitely high. At the end of the tire contact patch, for example, the bristles may not be able to withstand the higher lateral force any longer and may begin to slip. In FIG. 7, the lateral displacement is divided into an adhesion region where sliding does not occur and sliding regions where sliding occurs. A uniform normal distribution of $$\frac{F_z}{2a}$$

across the tire contact patch can be assumed. Lateral displacement is then limited as shown in Equation 4.

$$-\mu \frac{F_z}{2a} \leq c_{py} x \tan \delta \leq \mu \frac{F_z}{2a} \quad \text{Equation 4}$$

The tire can be expected to be sliding when the conditions in Equation 5 or 6 are met.

$$x \leq -x_s = -\frac{\mu F_z}{2 a c_{py} \tan \delta} \quad \text{Equation 5}$$

$$x \geq x_s = \frac{\mu F_z}{2 a c_{py} \tan \delta} \quad \text{Equation 6}$$

The conditions that will induce sliding are set forth in Equation 7.

$$|x_s| \leq a \rightarrow \left|\frac{\mu F_z}{2ac_{py}\tan\delta}\right| \leq a \rightarrow |\delta| \geq \tan^{-1}\left(\frac{\mu F_z}{2a^2 c_{py}}\right) \quad \text{Equation 7}$$

Full sliding may occur when the conditions in Equation 8 are met.

$$|x_s|=0 \rightarrow \delta=90° \quad \text{Equation 8}$$

If one integrates over adhesion and the sliding region, the alignment torque can be defined as set forth in Equation 9.

$$M_z = \int_{-a}^{-x_s} -\frac{\mu F_z}{2a} x\, dx + \int_{-x_s}^{+x_s} c_{py} x^2 \tan\delta\, dx + \int_{x_s}^{a} \frac{\mu F_z}{2a} x\, dx = \quad \text{Equation 9}$$

$$\frac{\mu F_z}{2a}(a^2 - x_s^2) + c_{py}\tan\delta \frac{2}{3}x_s^2 =$$

$$\frac{\mu F_z}{2a}\left(a^2 - \left(\frac{\mu F_z}{2ac_{py}\tan\delta}\right)^2\right) + c_{py}\tan\delta \frac{2}{3}\left(\frac{\mu F_z}{2ac_{py}\tan\delta}\right)^3$$

Thus, the alignment torque can be expressed as set forth in Equations 10, 11, and 12.

$$M_z = \frac{2}{3}c_{py}a^3 \tan\delta \quad \text{Equation 10}$$

$$|\delta| < \tan^{-1}\left(\frac{\mu F_z}{2a^2 c_{py}}\right)$$

$$M_z = \frac{\mu F_z}{2a}\left(a^2 - \left(\frac{\mu F_z}{2ac_{py}\tan\delta}\right)^2\right) + c_{py}\tan\delta \frac{2}{3}\left(\frac{\mu F_z}{2ac_{py}\tan\delta}\right)^3 \text{ else} \quad \text{Equation 11}$$

$$M_z = \frac{1}{2}\mu F_z a \quad \text{Equation 12}$$

$$\delta \rightarrow 90°$$

Figure 8:
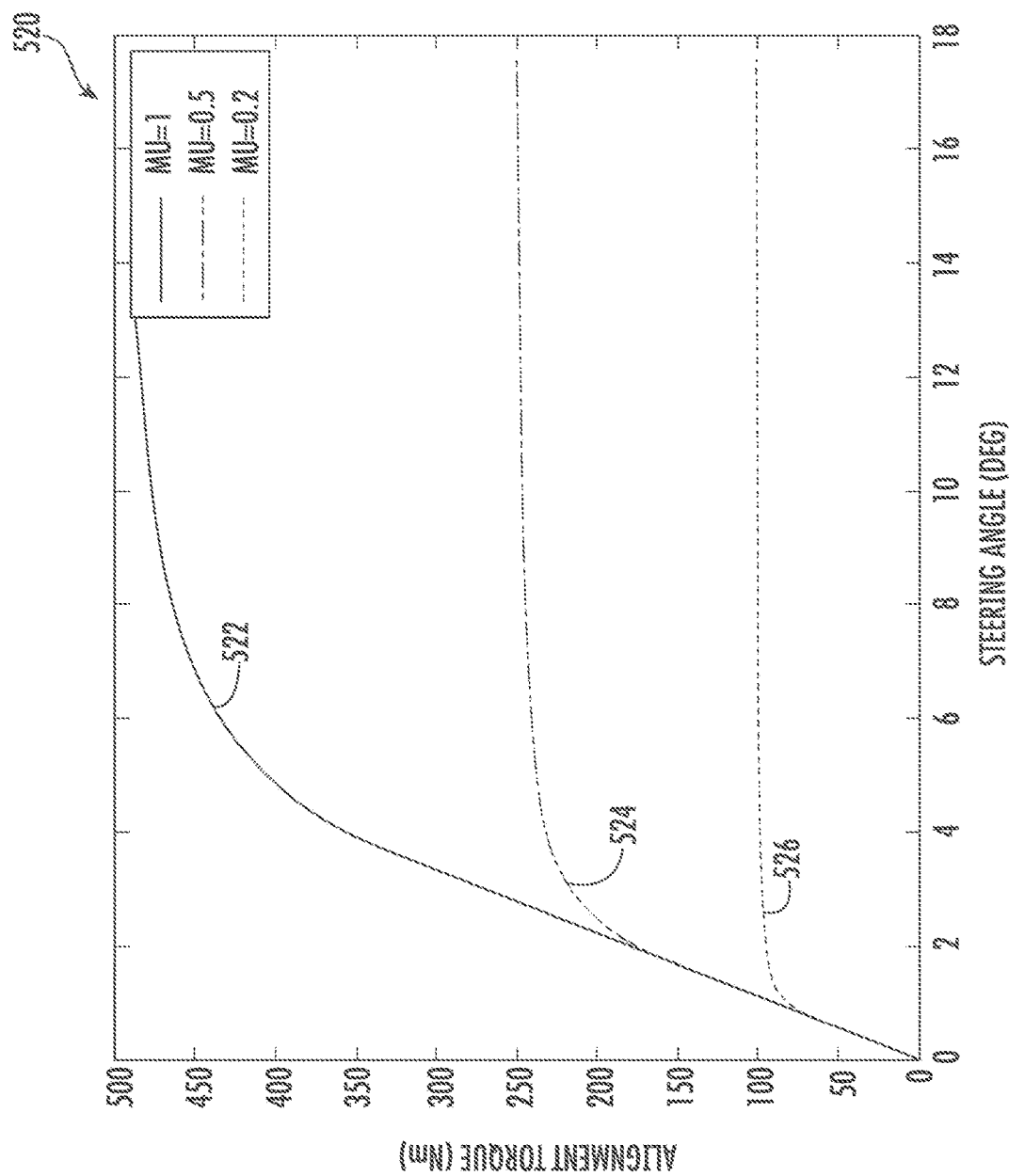
FIG. 8 depicts a graph illustrating a relationship between steering angle and alignment torque according to example embodiments of the present disclosure.

FIG. 8 is a graph 520 that plots an expression of alignment torque as a function of steering angle. The graph depicts three lines 522, 524, and 526 representing driving surfaces with three different coefficients of friction. Line 522 represents a driving surface having a maximum coefficient of friction, mu=1. Line 524 represents a driving surface having a middle range coefficient of friction, mu=0.5. Line 526 represents a driving surface having a low range coefficient of friction mu=0.2.

Line 526 illustrates that a driving surface with a low coefficient of friction has a low peak alignment torque. Additionally, line 526 illustrates that for a driving surface with a low coefficient of friction, the peak alignment torque will be reached at a relatively low steering angle. Line 524 illustrates that for driving surface having a middle range coefficient of friction, the peak alignment torque is in a middle range in the steering angle is larger to reach the peak alignment torque. Finally, line 522 illustrates that for a driving surface having a high coefficient of friction, the peak alignment torque is in a high range and a larger steering angle is required to reach the peak alignment torque. Together, the lines illustrate that close to the origin the alignment torque and steering angle characteristics are similar and are somewhat independent of friction.

It may be noted that the above expressions in equations 10, 11, and 12 are valid for a steering axis that passes through a center of the tire contact patch. Typically, the center rotation may have a longitudinal displacement (e.g., caster rail) and a lateral displacement (scrub radius). Equation 13 sets forth a definition for alignment torque Ta that incorporates these effects as a scaling factor $\gamma$.

$$T_a = \gamma M_z \quad \text{Equation 13}$$

In Equation 13, $M_z$ is the alignment torque as set forth in Equations 10, 11, and 12 with no caster trail and scrub radius.

In example embodiments, sensors 101 include a rackforce sensor and/or a pinion angle sensor. The rackforce sensor may be a virtual sensor in some examples. The alignment torque at the input pinion of a steering system may be equal to a sum of a motor input and a driver input to the steering system. The rack force sensor may provide data indicative of a rack force $F_r$. The rack force can be defined as set forth in Equation 14.

$$F_r = b \cos \delta^* T_{a,1} + b \cos \delta^* T_{a,2} = \gamma b \cos \delta (M_{z,1} + M_{z,2}) \quad \text{Equation 14}$$

For a vehicle that steers both front wheels and normal forces are equal, the rack force can be defined as set forth in Equation 15.

$$F_r = 2\gamma b \cos \delta M_{z,1} \quad \text{Equation 15}$$

If the tires become saturated, the rack force can be defined as set forth in Equation 16.

$$F_r = 2\gamma b \cos\delta\left(\frac{1}{2}\mu F_z a\right) \rightarrow \mu = \frac{F_r}{\gamma a b F_z \cos\delta} \quad \text{Equation 16}$$

With the above expressions in mind, friction estimation system 150 can determine a friction associated with a driving surface utilizing friction probing controller 402 and/or friction estimator 404. The friction probing controller 402 can collect samples of alignment torque and steering angle data. In some examples, a threshold number of samples may be collected and used to estimate friction. Additionally a threshold excitation, such as a threshold steering angle and/or input torque may be used to estimate friction.

Figure 9:
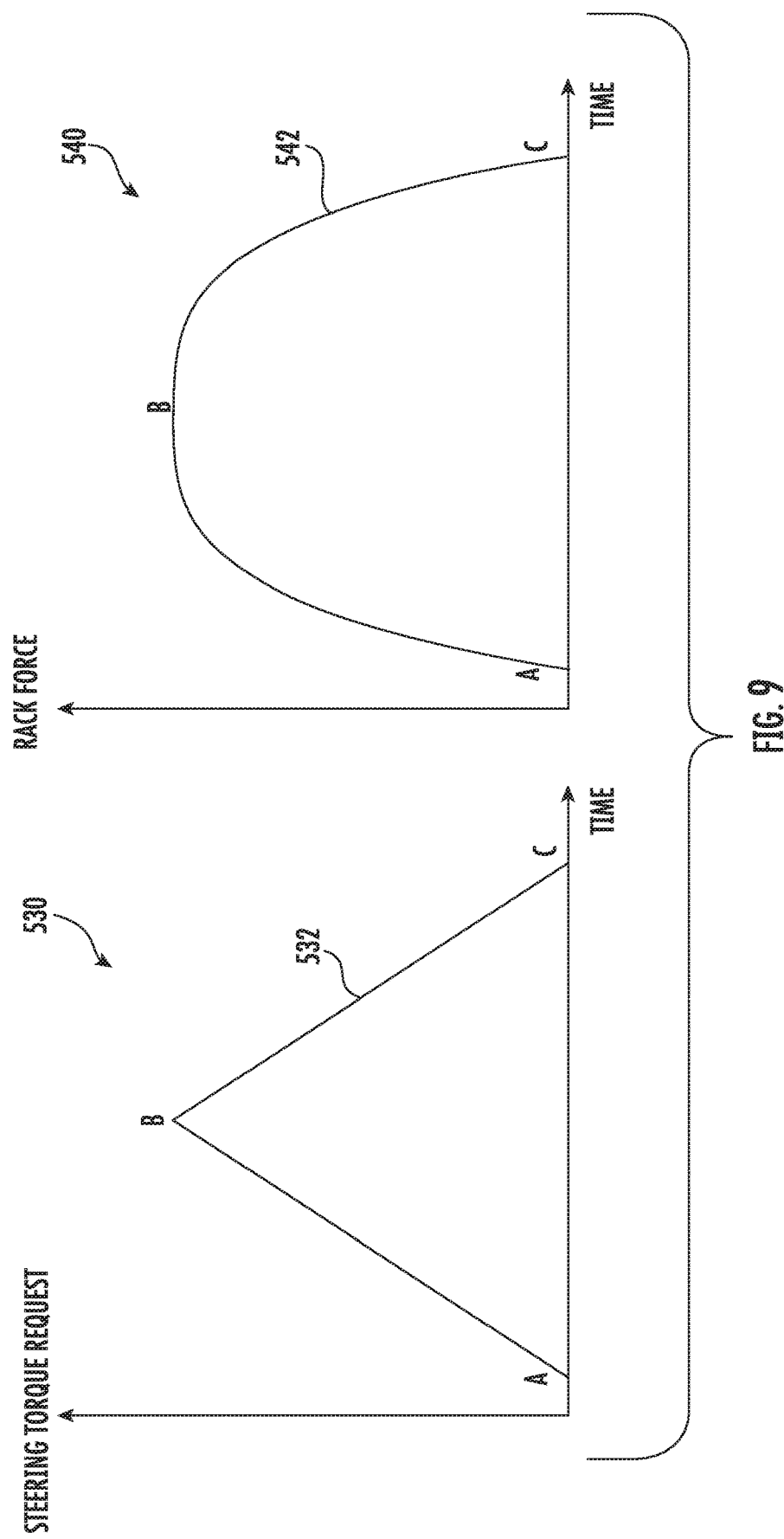
FIG. 9 depicts graphs illustrating an example of an input steering torque request and a resulting rack force associated with a steering system of an autonomous vehicle according to example embodiments of the present disclosure.

FIG. 9 depicts graphs illustrating a technique for measuring friction associated with a driving surface based on a steering wheel-based action in accordance with example embodiments of the disclosed technology. In response to a probing request and detecting an acceleration event, the friction probing controller 402 can ramp up a steering torque request 630 from a starting torque at A equal to zero to a maximum level at B as shown in graph 530. As shown in graph 540, a rack force will result from the input steering torque request. The rack force in FIG. 9 is shown as a function of steering angle. The rack force increases from point A to point B as the steering angle is increased in response to the input steering torque request. Once enough samples have been collected and a threshold excitation has been observed, the steering torque request can be ramped down as shown at 532 from point B to point C. The rack force decreases at 542 from point B to point C as the steering torque request ramps down. By way of example, the time from point A to point C can be approximately 1 second in some examples. In other examples, the time may be greater than or less than 1 second.

Figure 10:
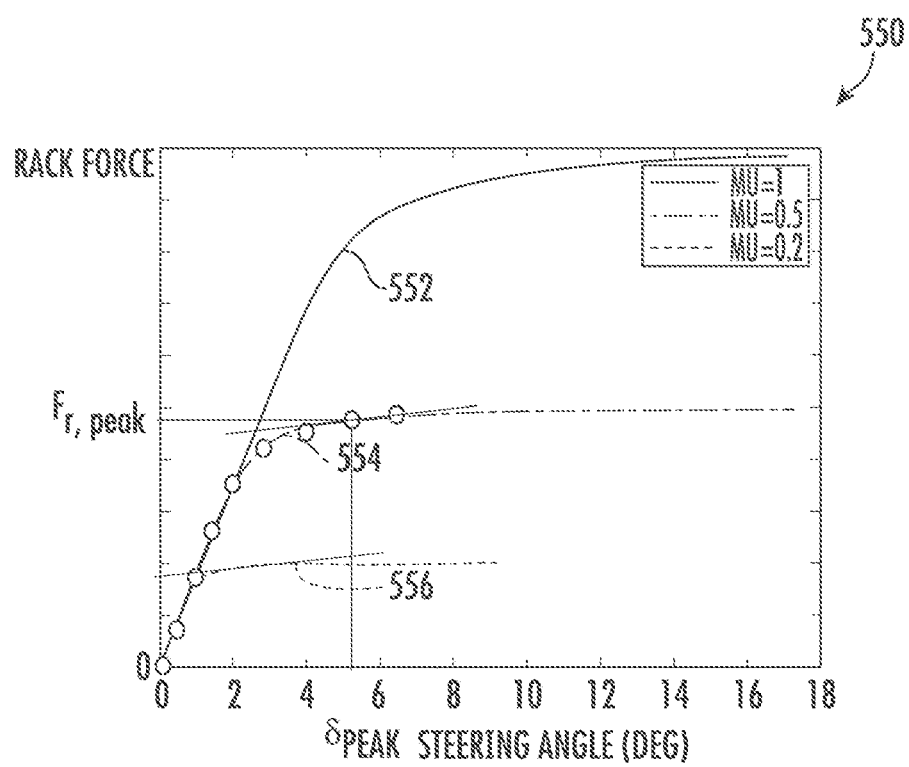
FIG. 10 depicts a graph illustrating a relationship between steering angle and rack force, and a technique for determining a maximum rack force and maximum steering angle according to example embodiments of the present disclosure.

FIG. 10 is a graph 550 depicting a technique for calculating a friction associated with a surface based on the measured rack force associated with an input steering torque. In one example, friction estimator 404 may determine a friction by finding a peak of the rack force that results from a ramping input steering torque request. The peak of the rack force as defined in Equation 15 can be used in example embodiments. The graph depicts three lines 552, 554, and 556 representing driving surfaces with three different coefficients of friction. Line 552 represents a driving surface having a maximum coefficient of friction, mu=1. Line 554 represents a driving surface having a middle range coefficient of friction, mu=0.5. Line 556 represents a driving surface having a low range coefficient of friction mu=0.2.

Various techniques may be used to find the peak of the rack force. In one example, the peak can be found by defining a threshold of the curve inclination defined by Equation 17.

$$dF_r/d\delta \quad \quad \text{Equation 17}$$

Equation 17 defines a change in rack force relative to a change in steering angle. More particularly, the derivative of the rack force relative to the derivative of the steering angle is defined as a quotient of the two derivatives, respectively.

With reference to Equation 17 and FIG. 10, when the input steering torque is requested, the resulting rack force and steering data (e.g., steering angle) can be sampled as illustrated by the rings in FIG. 10. When the change in rack force relative to the change in steering angle satisfies a predetermined threshold (e.g., is greater than or equal to a threshold), the peak friction can be found based on the peak steering angle $\delta_{peak}$ and a peak rack force $\delta_{peak}$. More particularly, the friction can be calculated as set forth in Equation 18.

$$\mu = \frac{F_{r,peak}}{\gamma ab F_z \cos\delta_{peak}} \quad \quad \text{Equation 18}$$

In Equation 18, γab may be a design parameter and $F_z$ may be a normal load that is determined from suspension sensors or from a vehicle state estimator.

Figure 11:
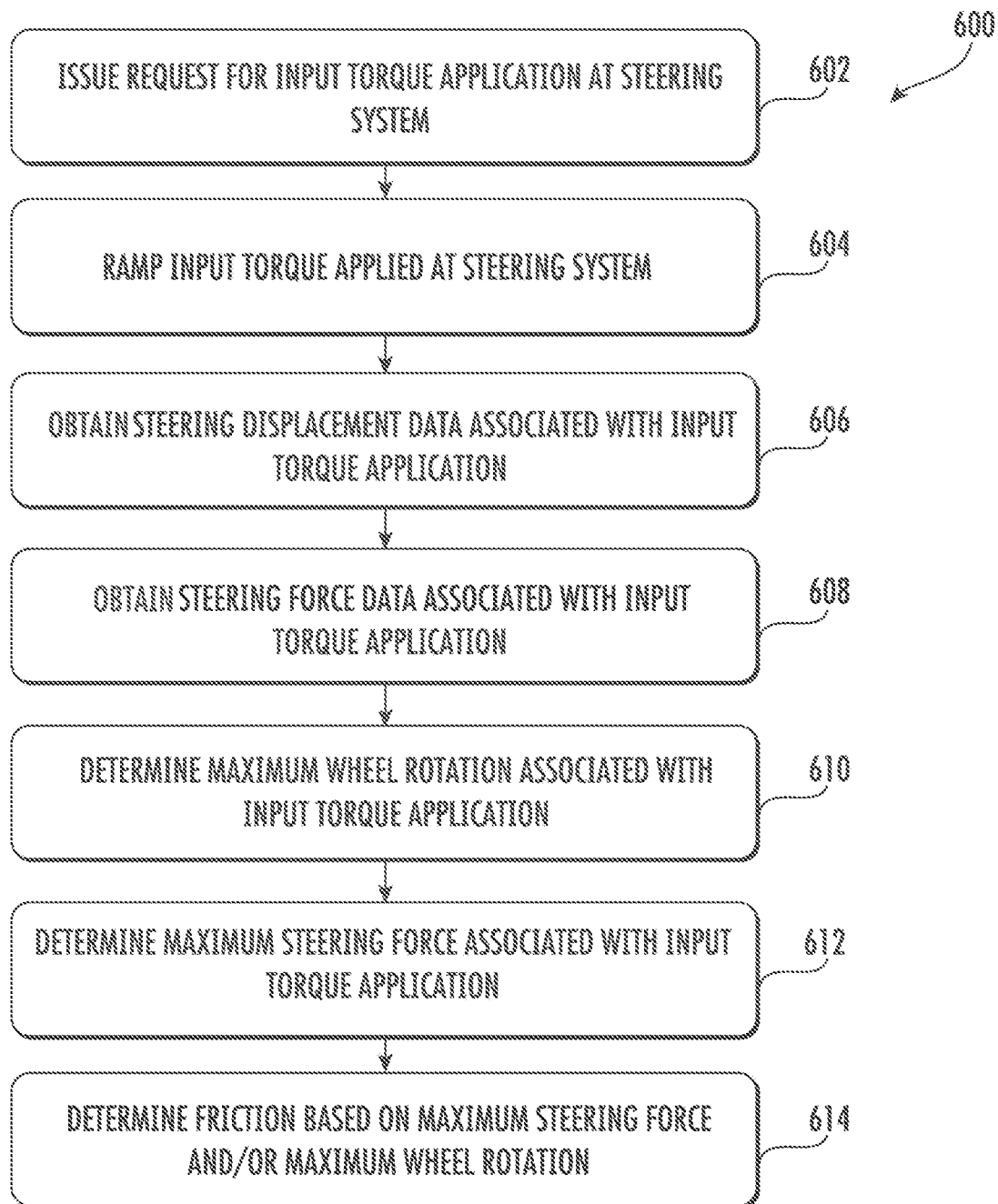
FIG. 11 depicts a flowchart diagram of an example process of determining a friction estimation for an autonomous vehicle using one or more steering wheel-based actions according to example embodiments of the present disclosure.

FIG. 11 is a flow chart diagram depicting an example process 600 for determining a friction of a driving surface in association with a steering wheel-based action during a detected acceleration event in accordance with example embodiments of the disclosed technology. In some examples, process 600 may be performed by a friction estimation system 150 of vehicle computing system 102. Process 600 may be performed in association with an autonomous vehicle and/or a non-autonomous vehicle.

At 602, a request for an input torque application at a steering system of an autonomous or non-autonomous vehicle is issued. For example, a friction probing controller 402 of friction estimation system 150 may issue a steering torque request to the steering actuator 420. The steering torque request may include an increasing steering torque. In some examples, the steering torque quest may comprise a request to ramp up of the steering torque applied to the steering system. In response to the input torque request, the steering actuator can ramp the input torque applied in the steering system at 604. In some examples, the input torque is an alignment torque.

At 606, steering displacement data such as wheel rotation data associated with the input torque application at the steering system is obtained. In example embodiments, the wheel rotation data may include data indicative of a steering angle that results from the input torque application. The wheel rotation data may be obtained by friction probing controller 402 and/or friction estimator 404 in example embodiments.

At 608, steering force data associated with the input torque application at the steering system is obtained. In example embodiments, the steering force data may include an indication of an input torque, an alignment torque, and/or a rack force associated with an input torque, etc.

At 610, a maximum wheel rotation associated with the input torque application is determined. In example embodiments, the maximum wheel rotation is a maximum steering angle.

At 612, a maximum steering force associated with the input torque application is determined. In example embodiments, the maximum steering force is a maximum rack force associated with the input torque.

In some examples, the maximum wheel rotation and a maximum steering force at 610 and 612 can be determined based on changes in the maximum wheel rotation and maximum steering force relative to one another. For example, a change in the rack force relative to a change in the wheel rotation may be analyzed for an increasing input torque in order to determine when the relative change satisfies a threshold. More particularly, as earlier described, a quotient resulting from a derivative of the rack force divided by a derivative of the steering angle may be observed as the input torque is increased until the quotient meets or exceeds the threshold. When the threshold is satisfied, the corresponding steering angle and rack force can be determined as the maximum wheel rotation and maximum steering force respectively.

At 614, a friction of the driving surface is determined based on the maximum steering force and/or the maximum wheel rotation. In example embodiments, data indicative of the friction of the driving surface is generated at 614. The friction of the driving surface may be determined based at least in part on a peak rack force and a peak steering angle in some examples.

Figure 12:
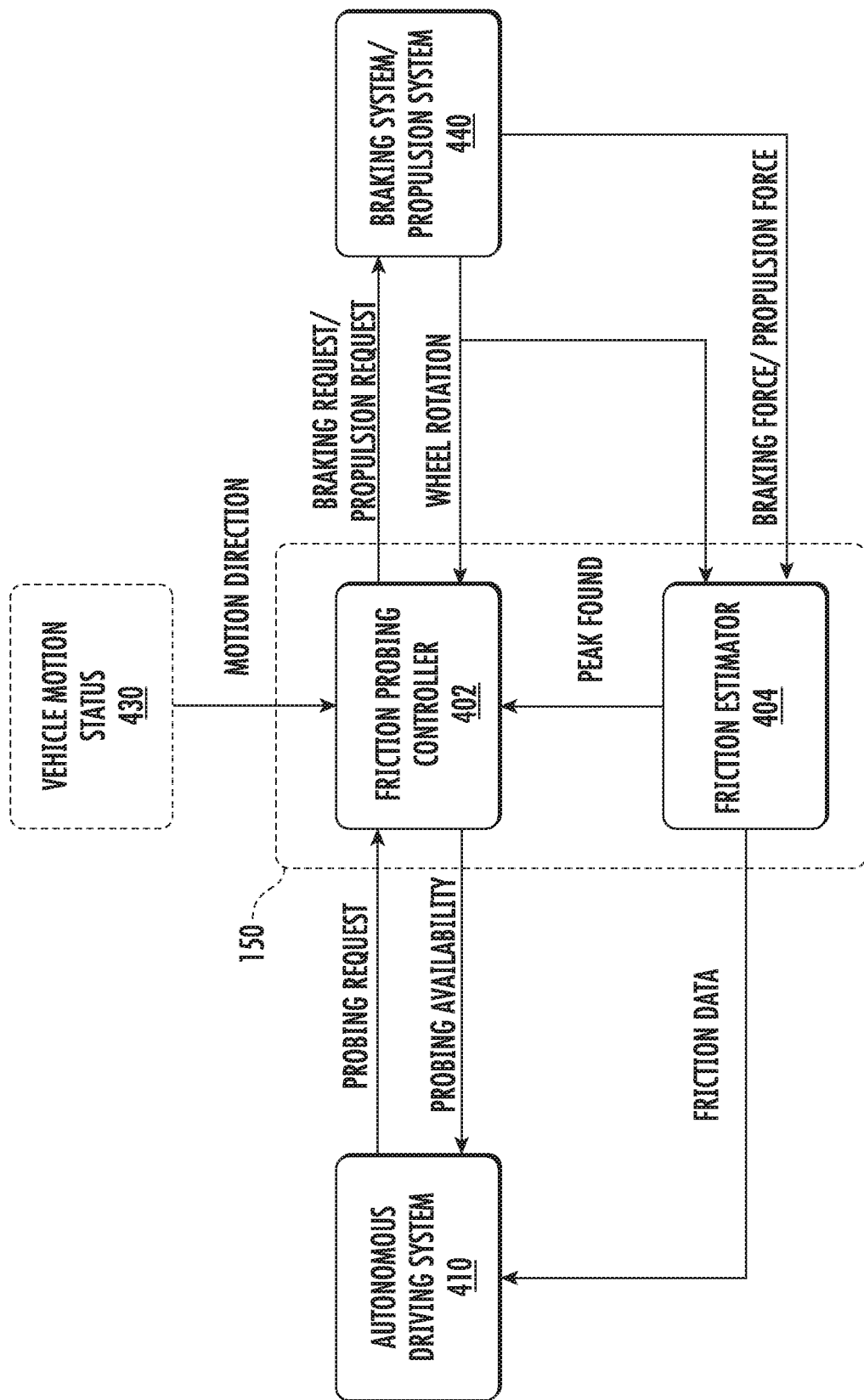
FIG. 12 depicts a block diagram of an example vehicle computing system and braking/propulsion system according to example embodiments of the present disclosure.

FIG. 12 is a block diagram depicting additional details of friction estimation system 150 and the generation of friction data using a braking and/or propulsion wheel-based action. In the example of FIG. 12, friction probing controller 402 responds to determining that a friction estimation process can be performed by issuing a braking request and/or propulsion request to a braking system and/or propulsion system, depicted collectively as braking system/propulsion system 440 in FIG. 12. Braking system/propulsion system 440 is an example of a vehicle control 107 and a braking and/or propulsion request is one example of a request for a wheel-based action. The braking and/or propulsion request may specify an input braking force to be applied to the braking system in some examples. More particularly, the braking force request may specify a ramp up of the input braking force or an increase in the braking force from a low value to a high value. In another example, the braking and/or propulsion request may specify an input propulsion force to be applied to the propulsion system, such as an amount of input provided by an accelerator. More particularly, the propulsion request may specify a ramp up of the input propulsion force or an increase in the propulsion force from a low value to a high value.

In some examples, the braking force and/or propulsion force may be issued to the braking system/propulsion system requesting an increase in force until a peak friction is measured or otherwise found. At that point, the braking request/propulsion request may ramp down the input force until it reaches zero or another steady-state level. In some examples, if the braking system/propulsion system has a problem with actuation in response to the input force request, the probing availability can be false.

In response to the input braking and/or propulsion force applied by braking system/propulsion system 440, the braking system/propulsion system provides an indication of the resulting wheel rotation. In some example, the wheel rotation is a wheel rotation relative to the surface of the travelway, such as in response to the tire sliding relative to the surface. For example, data indicative of the resulting wheel rotation can be provided back to friction probing controller 402 as well as to friction estimator 404. Additionally, a braking force such as an input braking force or a wheel torque as measured by one or more sensors associated with the braking system/propulsion system can be provided to the friction probing controller 402 as well as friction estimator 404. In some examples, braking force data can include an indication of an input braking force, a resulting wheel torque, etc. In other examples, the braking force data may include an indication of a rotation torque associated with the wheel and/or tire. As a specific example, an input braking force provided by an electric motor can be measured and provided as the braking force data.

Friction estimator 404 can obtain the braking force data and the wheel rotation data and determine a peak friction associated with the braking and/or propulsion wheel-based action. Generally, higher levels of friction will be determined in response to higher levels of peak wheel torque and smaller wheel rotations. Similarly, lower levels of friction will be determined in response to lower levels of peak wheel torque and larger wheel rotations.

Once a peak friction is found, friction estimator 404 provides a signal to friction probing controller 402 that the braking and/or propulsion request can be ended. Friction estimator 404 provides data indicative of the friction measured using the wheel-based action to autonomous driving system 410 of an autonomous vehicle or a vehicle control system of a non-autonomous vehicle.

Figure 13:
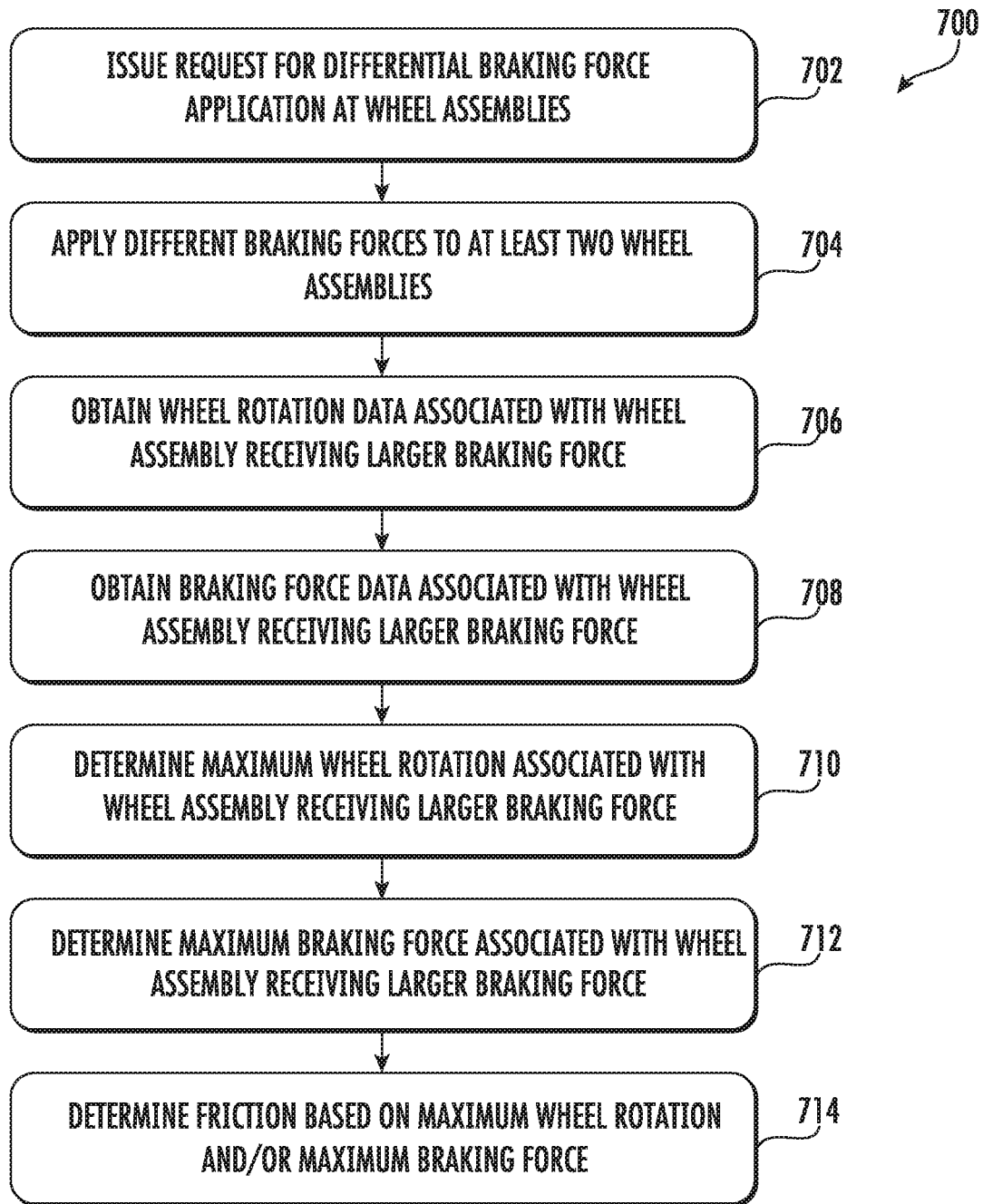
FIG. 13 depicts a flowchart diagram of an example process of determining a friction estimation for an autonomous vehicle using one or more braking wheel-based actions according to example embodiments of the present disclosure.

FIG. 13 is a flowchart diagram depicting an example process 700 for determining a friction in association with a braking wheel-based action during a detected event in accordance with example embodiments of the disclosed technology. In some examples, process 700 may be performed by a friction estimation system 150 of vehicle computing system 102. FIG. 13 depicts a specific example where differential braking forces are applied. It is noted, however, that differential braking forces are not required. For example, one or more input braking forces can be applied to one or more wheel assemblies as part of a braking wheel-based action. In some examples, a single braking force is applied to one wheel assembly. In other examples, a single braking force is applied to multiple wheel assemblies. In yet other examples, multiple braking forces may be applied.

At 702, one or more requests are issued to the vehicle control system for a braking wheel-based action. In example embodiments, the request(s) for the wheel-based action may be issued in response to a request for a friction determination and detecting an acceleration event. More particularly, in some implementations, friction estimation system 150 may issue one or more requests to the vehicle controller 106 for a differential braking force application at two or more wheel assemblies of the autonomous vehicle. Vehicle controller 106 can issue one or more requests and/or commands to an appropriate vehicle control system, such as the braking system, to initiate the wheel-based action. For example, friction probing controller 402 may issue a request for a differential braking action during a stop, or while the vehicle is moving and in a manner intended to be non-perceptible by user.

At 704, a differential braking force is applied to at least two wheel assemblies of the vehicle. In example embodiments, the differential braking force can be applied as part of an acceleration event including a decrease in speed. The differential braking force can be applied to cause a larger braking force in association with at least one wheel assembly relative to at least one other wheel assembly that is also receiving a braking force. The larger braking force can be applied to enable a friction determination to be determined using the larger braking force, while avoiding or minimizing disruption to passengers in the vehicle. For example, the vehicle computing system may apply a larger braking force to one wheel in order to cause a slip or slide of the corresponding tire relative to the driving surface. The larger braking force may be increased over time until a slip or slide of the tire is detected. Smaller braking forces can be applied to the other wheels so that a slide or slip is not experienced. In this manner a passenger may not perceive the slip or slide associated with the larger braking force.

At 706 and 708, operational data associated with the wheel-based action during the detected acceleration event is obtained. At 706, wheel rotation data associated with the wheel assembly receiving the larger braking force can be received. The wheel rotation data may indicate a number of degrees of rotation of the wheel during the slip of the tire or the number of degrees of rotation throughout the larger braking force application. Determining the wheel rotation data at 706 is optional. In some examples, the wheel rotation data may be determined using one or more wheel encoder sensors. At step 708, braking force data associated with the wheel assembly receiving the larger braking force can be obtained. The braking force data may indicate braking forces applied to the wheel assembly during a slip of the tire or may indicate braking forces applied throughout application of the larger braking force. The braking force data can be measured by a sensor of the braking assembly in some examples. For example, a sensor may measure the output of an electric motor that applies an input braking force. Examples of braking forces include an input braking force and a resulting wheel torque associated with the input braking force.

At 710, a maximum wheel rotation of the wheel assembly receiving the larger braking force is determined. At 712, a maximum braking force of the wheel assembly receiving the larger braking force is determined.

At 714, a friction is determined for the driving surface based at least in part on the maximum wheel rotation and/or maximum braking force. For example, a calculation can be performed that results in a higher friction estimation for the surface in response to larger wheel rotations or larger maximum braking forces. A wheel can be expected to rotate more under a braking pressure when in contact with a higher friction surface than with a lower friction surface. Similarly, a smaller braking force can be expected to cause a slip of a tire when in contact with a lower friction surface. In example embodiments, data indicative of the friction of the driving surface is generated at 714.

Figure 14:
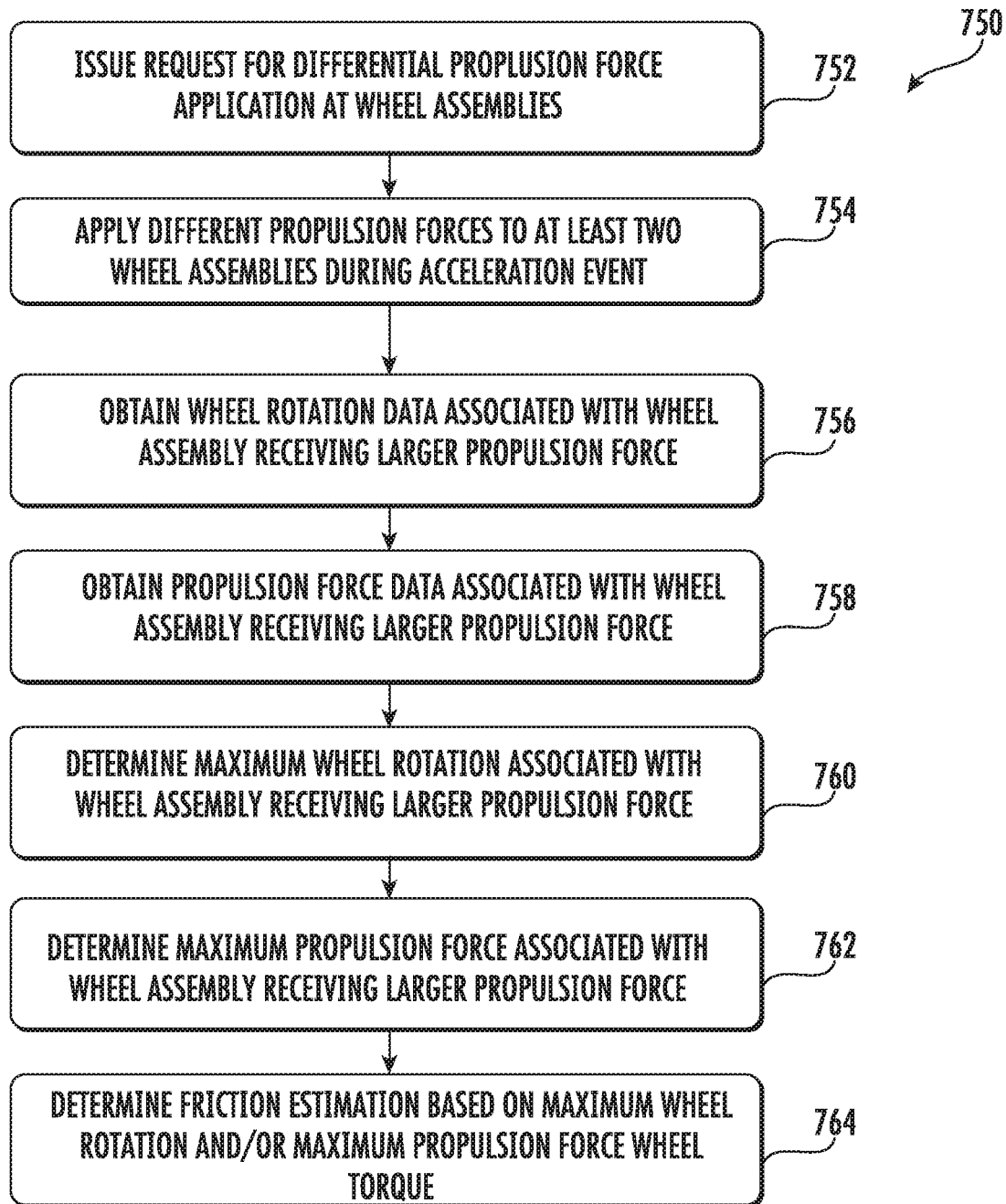
FIG. 14 depicts a flowchart diagram of an example process of determining a friction estimation for an autonomous vehicle using one or more propulsion wheel-based actions according to example embodiments of the present disclosure.

FIG. 14 is a flow chart diagram depicting an example process 750 for determining a friction in association with a propulsion wheel-based action during a detected acceleration event in accordance with example embodiments of the disclosed technology. In some examples, process 750 may be performed by a friction estimation system 150 of vehicle computing system 102. FIG. 14 depicts a specific example where differential propulsion forces are applied. It is noted, however, that differential propulsion forces are not required. For example, one or more input propulsion forces can be applied to one or more wheel assemblies as part of a propulsion wheel-based action. In some examples, a single propulsion force is applied to one wheel assembly. In other examples, a single propulsion force is applied to multiple wheel assemblies. In yet other examples, multiple propulsion forces may be applied.

At 752, one or more requests are issued to the vehicle control system for a propulsion wheel-based action. In example embodiments, the request(s) for the wheel-based action may be issued in response to a request for a friction determination and detecting an acceleration event. More particularly, in some implementations, friction estimation system 150 may issue one or more requests to the vehicle controller 106 for a differential propulsion force application at two or more wheel assemblies of the autonomous vehicle. Vehicle controller 106 can issue one or more requests and/or commands to an appropriate vehicle control system, such as the propulsion system, to initiate the wheel-based action. For example, friction probing controller 402 may issue a request for a differential propulsion action as the vehicle increases speed when leaving a stop sign or intersection.

At 754, a differential propulsion force is applied to at least two wheel assemblies of the vehicle. In example embodiments, the differential propulsion force can be applied as part of an event including an increase in speed. The differential propulsion force can be applied to cause a larger propulsion force in association with at least one wheel assembly relative to at least one other wheel assembly that is also receiving a propulsion force. The larger propulsion force can be applied to enable a friction determination to be determined using the larger propulsion force, while avoiding or minimizing disruption to passengers in the vehicle. For example, the vehicle computing system may apply a larger propulsion force to one wheel in order to cause a slip or slide of the corresponding tire relative to the driving surface. The larger propulsion force may be increased over time until a slip or slide of the tire is detected. Smaller propulsion forces can be applied to the other wheels so that a slide or slip is not experienced. In this manner a passenger may not perceive the slip or slide associated with the larger propulsion force. In some examples, one or more wheels may receive a braking force while a differential propulsion force is applied.

At 756 and 758, operational data associated with the wheel-based action during the detected acceleration event is obtained. At 756, wheel rotation data such as wheel rotation data associated with the wheel assembly receiving the larger propulsion force can be received. The wheel rotation data may indicate a number of degrees of rotation of the wheel during the slip of the tire or the number of degrees of rotation throughout the larger propulsion force application. Determining the wheel rotation data at 760 is optional. In some examples, the wheel rotation data may be determined using one or more wheel encoder sensors. At step 758, propulsion force data associated with the wheel assembly receiving the larger propulsion force can be obtained. The propulsion force data may indicate propulsion forces applied to the wheel assembly during a slip of the tire or may indicate propulsion forces applied throughout application of the larger propulsion force. The propulsion force data can be measured by a sensor of the propulsion assembly in some examples. In other examples, the propulsion force data may be determined based on an output of the propulsion system, such as an amount of rotational force applied to the wheel. Examples of propulsion forces include an input propulsion force and a resulting wheel torque associated with the input propulsion force.

At 760, a maximum wheel rotation of the wheel assembly receiving the larger propulsion force is determined. At 762, a maximum propulsion force of the wheel assembly receiving the larger propulsion force is determined.

At 764, a friction is determined for the driving surface based at least in part on the maximum wheel rotation and/or maximum propulsion force. For example, a calculation can be performed that results in a higher friction estimation for the surface in response to smaller wheel rotations or smaller maximum wheel torques. A wheel can be expected to rotate more under the same propulsion force when in contact with a lower friction surface than a higher friction surface. Similarly, a smaller propulsion force can be expected to cause a slip of a tire when in contact with a lower friction surface than with a higher friction surface. In example embodiments, data indicative of the friction of the driving surface is generated at 764.

FIG. 15 depicts a block diagram of an example computing system 1000 according to example embodiments of the present disclosure. The example computing system 1000 includes a computing system 1002 and a machine learning computing system 1030 that are communicatively coupled over a network 1080.

In some implementations, the computing system 1002 can perform friction determination processes, provide data indicative of the friction estimations, and/or use friction data as part of vehicle operations. In some implementations, the computing system 1002 can perform friction estimations using a machine-learned model. In some implementations, the computing system 1002 can be included in an autonomous or non-autonomous vehicle. For example, the computing system 1002 can be on-board the vehicle. In some embodiments, computing system 1002 can be used to implement vehicle computing system 102. In other implementations, the computing system 1002 is not located on-board the vehicle. For example, the computing system 1002 can operate offline to obtain sensor data and perform friction estimation. The computing system 1002 can include one or more distinct physical computing devices.

The computing system 1002 includes one or more processors 1012 and a memory 1014. The one or more processors 1012 can be any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage media, such as RAM, ROM, EEPROM, EPROM, one or more memory devices, flash memory devices, etc., and combinations thereof.

The memory 1014 can store information that can be accessed by the one or more processors 1012. For instance, the memory 1014 (e.g., one or more non-transitory computer-readable storage mediums, memory devices) can store data 1016 that can be obtained, received, accessed, written, manipulated, created, and/or stored. The data 1016 can include, for instance, image or other sensor data captured by one or more sensors, machine-learned models, etc. as described herein. In some implementations, the computing system 1002 can obtain data from one or more memory device(s) that are remote from the computing system 1002.

The memory 1014 can also store computer-readable instructions 1018 that can be executed by the one or more processors 1012. The instructions 1018 can be software written in any suitable programming language or can be implemented in hardware. Additionally, or alternatively, the instructions 1018 can be executed in logically and/or virtually separate threads on processor(s) 1012.

For example, the memory 1014 can store instructions 1018 that when executed by the one or more processors 1012 cause the one or more processors 1012 to perform any of the operations and/or functions described herein, including, for example, generating machine-learned models, generating indications of friction, etc.

According to an aspect of the present disclosure, the computing system 1002 can store or include one or more machine-learned models 1010. As examples, the machine-learned models 1010 can be or can otherwise include various machine-learned models such as, for example, neural networks (e.g., deep neural networks or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1002 can receive the one or more machine-learned models 1010 from the machine learning computing system 1030 over network 1080 and can store the one or more machine-learned models 1010 in the memory 1014. The computing system 1002 can then use or otherwise implement the one or more machine-learned models 1010 (e.g., by processor(s) 1012). In particular, the computing system 1002 can implement the machine-learned model(s) 1010 to determine friction data based on sensor data.

The machine learning computing system 1030 includes one or more processors 1032 and a memory 1034. The one or more processors 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage media, such as RAM, ROM, EEPROM, EPROM, one or more memory devices, flash memory devices, etc., and combinations thereof. In some embodiments, machine learning computing system 1030 can be used to implement vehicle computing system 102.

The memory 1034 can store information that can be accessed by the one or more processors 1032. For instance, the memory 1034 (e.g., one or more non-transitory computer-readable storage mediums, memory devices) can store data 1036 that can be obtained, received, accessed, written, manipulated, created, and/or stored. The data 1036 can include, for instance, machine-learned models and flow graphs as described herein. In some implementations, the machine learning computing system 1030 can obtain data from one or more memory device(s) that are remote from the machine learning computing system 1030.

The memory 1034 can also store computer-readable instructions 1038 that can be executed by the one or more processors 1032. The instructions 1038 can be software written in any suitable programming language or can be implemented in hardware. Additionally, or alternatively, the instructions 1038 can be executed in logically and/or virtually separate threads on processor(s) 1032.

For example, the memory 1034 can store instructions 1038 that when executed by the one or more processors 1032 cause the one or more processors 1032 to perform any of the operations and/or functions described herein, including, for example, determining friction data and controlling an autonomous vehicle based on data indicative of friction of a driving surface associated with an autonomous vehicle.

In some implementations, the machine learning computing system 1030 includes one or more server computing devices. If the machine learning computing system 1030 includes multiple server computing devices, such server computing devices can operate according to various computing architectures, including, for example, sequential computing architectures, parallel computing architectures, or some combination thereof.

In addition or alternatively to the machine-learned model(s) 1010 at the computing system 1002, the machine learning computing system 1030 can include one or more machine-learned models 1040. As examples, the machine-learned models 1040 can be or can otherwise include various machine-learned models such as, for example, neural networks (e.g., deep neural networks) or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1030 can communicate with the computing system 1002 according to a client-server relationship. For example, the machine learning computing system 1030 can implement the machine-learned models 1040 to provide a web service to the computing system 1002. For example, the web service can provide indications of friction estimations in response to sensor data and/or other data received from an autonomous vehicle.

Thus, machine-learned models 1010 can located and used at the computing system 1002 and/or machine-learned models 1040 can be located and used at the machine learning computing system 1030.

In some implementations, the machine learning computing system 1030 and/or the computing system 1002 can train the machine-learned models 1010 and/or 1040 through use of a model trainer 1060. The model trainer 1060 can train the machine-learned models 1010 and/or 1040 using one or more training or learning algorithms. One example training technique is backwards propagation of errors. In some implementations, the model trainer 1060 can perform supervised training techniques using a set of labeled training data. In other implementations, the model trainer 1060 can perform unsupervised training techniques using a set of unlabeled training data. The model trainer 1060 can perform a number of generalization techniques to improve the generalization capability of the models being trained. Generalization techniques include weight decays, dropouts, or other techniques.

In particular, the model trainer 1060 can train a machine-learned model 1010 and/or 1040 based on a set of training data 1062. The training data 1062 can include, for example, ground truth data including annotations for sensor data portions and/or vehicle state data. The model trainer 1060 can be implemented in hardware, firmware, and/or software controlling one or more processors.

In some examples, the model trainer 1060 can train a machine-learned model 1010 and/or 1040 configured to generate data indicative of friction associated with a driving surface. In some examples, the machine-learned model 1010 and/or 1040 is trained using sensor data that has been labeled or otherwise annotated as having a correspondence to a surface having a particular friction associated therewith. By way of example, sensor data collected in association with a surface having a measured friction can be labeled to indicate that it corresponds to a particular level or measure of friction. In some instances, the label may be a simple annotation that the sensor data corresponds to a positive training dataset.

The computing system 1002 can also include a network interface 1024 used to communicate with one or more systems or devices, including systems or devices that are remotely located from the computing system 1002. The network interface 1024 can include any circuits, components, software, etc. for communicating with one or more networks (e.g., 1080). In some implementations, the network interface 1024 can include, for example, one or more of a communications controller, receiver, transceiver, transmitter, port, conductors, software and/or hardware for communicating data. Similarly, the machine learning computing system 1030 can include a network interface 1064.

The network(s) 1080 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1080 can be accomplished, for instance, via a network interface using any type of protocol, protection scheme, encoding, format, packaging, etc.

FIG. 15 illustrates one example computing system 1000 that can be used to implement the present disclosure. Other computing systems can be used as well. For example, in some implementations, the computing system 1002 can include the model trainer 1060 and the training data 1062. In such implementations, the machine-learned models 1010 can be both trained and used locally at the computing system 1002. As another example, in some implementations, the computing system 1002 is not connected to other computing systems.

In addition, components illustrated and/or discussed as being included in one of the computing systems 1002 or 1030 can instead be included in another of the computing systems 1002 or 1030. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
one or more processors; and
one or more non-transitory computer-readable media that store instructions that, when executed by the one or more processors, cause the computing system to perform operations, the operations comprising:
issuing, by a friction probing controller of an autonomous vehicle, a request for a friction estimation associated with a surface upon which the autonomous vehicle is traveling;
detecting at least one of an acceleration, a deceleration, or a stop associated with the autonomous vehicle based at least in part on at least one of map data, motion planning data, or route planning data associated with the autonomous vehicle;
performing a wheel-based action in response to the request;
obtaining operational data descriptive of the wheel-based action;
determining the friction estimation based at least in part on the operational data; and
controlling the autonomous vehicle based at least in part on the friction estimation.

2. The computing system of claim 1, wherein controlling the autonomous vehicle based at least in part on the friction estimation comprises at least one of:
generating a motion plan based at least in part on the friction estimation; or
generating a route plan based at least in part on the friction estimation.

3. The computing system of claim 2, further comprising:
generating at least one motion planning constraint based at least in part on the friction estimation; and
generating at least one route planning constraint based at least in part on the friction estimation.

4. The computing system of claim 1, wherein detecting the at least one of the acceleration, the deceleration, or the stop associated with the autonomous vehicle is based at least in part on motion planning data associated with the autonomous vehicle.

5. The computing system of claim 1, wherein the operations further comprise:
determining data indicative of a confidence associated with the friction estimation.

6. The computing system of claim 5, wherein the operations further comprise:
lowering the confidence based on a time since the operational data was obtained.

7. The computing system of claim 1, wherein the wheel-based action is associated with movement of at least one tire of the autonomous vehicle relative to the surface.

8. The computing system of claim 7, wherein
the wheel-based action comprises providing an input torque at a steering system of the autonomous vehicle while the autonomous vehicle is stopped;
the operational data is indicative of at least one of the input torque, a steering force that results from the input torque, or a steering displacement that results from the input torque; and determining the friction estimation is based on at least one of the input torque, the steering force, or the steering displacement.

9. The computing system of claim 8, wherein:
the input torque increases over time; and
determining the friction estimation comprises determining data indicative of a peak steering force based on analyzing a change in the steering force relative to a change in the steering displacement.

10. The computing system of claim 9, wherein:
the steering displacement includes at least one of a wheel rotation or a steering angle.

11. The computing system of claim 7, wherein:
the wheel-based action includes providing one or more input braking forces to a braking system of the autonomous vehicle as part of decreasing speed of the autonomous vehicle;
the operational data includes data indicative of at least one of the input braking forces, a wheel torque associated with at least one of the input braking forces, or a wheel rotation associated with at least one of the input braking forces; and
determining the friction estimation is based on the data indicative of at least one of the input braking forces, the wheel torque, or the wheel rotation.

12. The computing system of claim 11, wherein:
the one or more input braking forces are increased over time; and
the operations further comprise determining an amount of the one or more input braking forces that is sufficient to cause a slip of a tire corresponding to a first wheel assembly.

13. The computing system of claim 11, wherein the operations further comprise rotating between a plurality of wheel assemblies that receive the one or more input braking forces.

14. The computing system of claim 7, wherein:
the wheel-based action includes providing one or more input propulsion forces to a propulsion system of the autonomous vehicle;
the operational data includes data indicative of at least one of the input propulsion forces, a wheel torque associated with at least one of the input propulsion forces, or a wheel rotation associated with at least one of the input propulsion forces; and
determining the friction estimation is based on the data indicative of at least one of the input propulsion forces, the wheel torque, or the wheel rotation.

15. The computing system of claim 1, wherein detecting the at least one of the acceleration, the deceleration, or the stop associated with the autonomous vehicle is based at least in part on map data associated with the autonomous vehicle.

16. The computing system of claim 1, wherein detecting the at least one of the acceleration, the deceleration, or the stop associated with the autonomous vehicle is based at least in part on sensor data.

17. The computing system of claim 1, wherein:
determining the friction estimation comprises determining whether friction associated with the surface satisfies one or more thresholds.

18. An autonomous vehicle, comprising:
one or more processors; and
one or more non-transitory computer-readable media that collectively store instructions that, when executed by the one or more processors, cause the one or more processors to perform operations, the operations comprising:
issuing, by a friction probing controller of the autonomous vehicle, a request for a friction estimation associated with a surface upon which the autonomous vehicle is traveling;
detecting at least one of an acceleration, a deceleration, or a stop associated with the autonomous vehicle based at least in part on at least one of map data, motion planning data, or route planning data associated with the autonomous vehicle;
performing a wheel-based action in response to the request;
obtaining operational data descriptive of the wheel-based action;
determining the friction estimation based at least in part on the operational data; and
generating at least one constraint for the autonomous vehicle based at least in part on the friction estimation.

19. The autonomous vehicle of claim 18, wherein the at least one constraint includes at least one of a motion planning constraint, a mapping constraint, or an operational constraint.

20. A computer-implemented method, comprising:
issuing, by a friction probing controller of an autonomous vehicle, a request for a friction estimation associated with a surface upon which the autonomous vehicle is traveling;
detecting at least one of an acceleration, a deceleration, or a stop associated with the autonomous vehicle based at least in part on at least one of map data, motion planning data, or route planning data associated with the autonomous vehicle;
performing a wheel-based action in response to the request;
obtaining operational data descriptive of the wheel-based action;
determining the friction estimation based at least in part on the operational data; and
controlling the autonomous vehicle based at least in part on the friction estimation.

* * * * *

UNITED STATES PATENT AND TRADEMARK OFFICE
CERTIFICATE OF CORRECTION

PATENT NO. : 11,427,223 B2
APPLICATION NO. : 16/131727
DATED : August 30, 2022
INVENTOR(S) : Scott C. Poeppel and Mats Jonasson Page 1 of 1

It is certified that error appears in the above-identified patent and that said Letters Patent is hereby corrected as shown below:

On the Title Page

Item (73), after "UATC, LLC, Mountain View, CA (US)", please add the following:
"Volvo Car Corporation, Göteborg (SE)"

Signed and Sealed this
Eleventh Day of October, 2022

Katherine Kelly Vidal
*Director of the United States Patent and Trademark Office*